(12) United States Patent
Noda

(10) Patent No.: US 7,035,340 B2
(45) Date of Patent: Apr. 25, 2006

(54) MODULATION DEVICE, DEMODULATION DEVICE, COMMUNICATION SYSTEM USING THE SAME, PROGRAM AND METHOD FOR IMPLEMENTING MODULATION AND DEMODULATION

(75) Inventor: Seiichi Noda, Tokyo (JP)

(73) Assignee: NEC Corporation, Tokyo (JP)

( * ) Notice: Subject to any disclaimer, the term of this patent is extended or adjusted under 35 U.S.C. 154(b) by 742 days.

(21) Appl. No.: 10/217,436

(22) Filed: Aug. 14, 2002

(65) Prior Publication Data
US 2003/0039315 A1 Feb. 27, 2003

(30) Foreign Application Priority Data
Aug. 16, 2001 (JP) .............................. 2001-246890
Jun. 7, 2002 (JP) .............................. 2002-167056

(51) Int. Cl.
*H04L 23/02* (2006.01)
(52) U.S. Cl. ....................... 375/261; 370/206
(58) Field of Classification Search ................ 375/260, 375/261, 264, 285, 295, 298, 316, 322, 324; 370/206–207; 332/103; 329/304
See application file for complete search history.

(56) References Cited

U.S. PATENT DOCUMENTS 4,646,326 A * 2/1987 Backof et al. ............... 375/261
5,185,763 A * 2/1993 Krishnan .................... 375/262
5,222,077 A * 6/1993 Krishnan .................... 375/261
6,421,395 B1 * 7/2002 Wei ............................. 375/265
6,553,063 B1 * 4/2003 Lin et al. .................... 375/223

FOREIGN PATENT DOCUMENTS

JP 4-196945 A 7/1992

OTHER PUBLICATIONS

Weidenfeller, Hermann, Vlcek, Anton: Digitale Modulationsverfahrenmit Sinusträger, Anwendung in der Funktechnik, 199?, Berlin u.a., Springerverlag, ISBN 3-540-60022-X, pp. 149-151 and 271-279.

Vlcek, Anton; Weindenfeller, Hermann: Digitale Modulationssysteme der Kategorie APK mit beliebiger geradzahliger und ungeradzahliger Stufenzahl, Teil I und II. IN: Frequenz 45 (1991) 1-2, pp. 38-44 and 45 (1991) 3-4, pp. 66-72.

* cited by examiner

*Primary Examiner*—Khanh Tran
(74) *Attorney, Agent, or Firm*—Sughrue Mion, PLLC

(57) ABSTRACT

A QAM modulation system capable of setting a number of multilevel to approximate $2^{(p+0.25)}$ (p is an integer equal to or more than 3) or $2^{(p+q/n)}$. An input data signal of 4p+1 bits are converted into four signals of p+1 bits, there being a predetermined relationship between the input data signal and the converted signals. The converted four signals are assigned to four phase planes, respectively. The four signals are time-division multiplexed and multilevel-modulated. Thereby, it becomes possible to set the number of multilevel to approximate $2^{(p+0.25)}$.

24 Claims, 11 Drawing Sheets

FIG. 4

| INPUT SIGNAL NUMBERS | POSSIBLE VALUES (SIGNAL POINTS) TAKEN IN MODULATION SYMBOLS | | | | TOTAL |
|---|---|---|---|---|---|
| | FIRST MODULATION SYMBOL | SECOND MODULATION SYMBOL | THIRD MODULATION SYMBOL | FOURTH MODULATION SYMBOL | |
| 1 ~ 64000 | 1~8 | 1~20 | 1~20 | 1~20 | 64000 |
| 64001 ~ 102400 | 9~14 | 1~20 | 1~20 | 1~16 | 38400 |
| 102401 ~ 122880 | 15~18 | 1~20 | 1~16 | 1~16 | 20480 |
| 122881 ~ 131072 | 19~20 | 1~16 | 1~16 | 1~16 | 8192 |

FIG. 5

| | | NUMBER OF SIGNAL POINTS |
|---|---|---|
| 8 POINTS OF FIRST SYMBOL | 8 POINTS IN 20QAM / 20QAM / 20QAM / 20QAM | 8×20×20×20=64000 |
| 6 POINTS OF FIRST SYMBOL | 6 POINTS IN 20QAM / 20QAM / 20QAM / 16QAM | 6×20×20×16=38400 |
| 4 POINTS OF FIRST SYMBOL | 4 POINTS IN 20QAM / 20QAM / 16QAM / 16QAM | 4×20×16×16=20480 |
| 2 POINTS OF FIRST SYMBOL | 2 POINTS IN 20QAM / 16QAM / 16QAM / 16QAM | 2×16×16×16=8192 |

TOTAL=131072 =2^17

FIG. 6

| TRANSMISSION CAPACITY (bit/Symbol) | p | 4p+1 | MODULATION SYMBOLS | | | | |
|---|---|---|---|---|---|---|---|
| | | | FIRST | | SECOND | THIRD | FOURTH |
| 3.25 | 3 | 13 | 10QAM | 4 | 10QAM | 10QAM | 10QAM |
| | | | | 3 | 10QAM | 10QAM | 8QAM |
| | | | | 2 | 10QAM | 8QAM | 8QAM |
| | | | | 1 | 8QAM | 8QAM | 8QAM |
| 4.25 | 4 | 17 | 20QAM | 8 | 20QAM | 20QAM | 20QAM |
| | | | | 6 | 20QAM | 20QAM | 16QAM |
| | | | | 4 | 20QAM | 16QAM | 16QAM |
| | | | | 2 | 16QAM | 16QAM | 16QAM |
| 5.25 | 5 | 21 | 40QAM | 16 | 40QAM | 40QAM | 40QAM |
| | | | | 12 | 40QAM | 40QAM | 32QAM |
| | | | | 8 | 40QAM | 32QAM | 32QAM |
| | | | | 4 | 32QAM | 32QAM | 32QAM |
| 6.25 | 6 | 25 | 80QAM | 32 | 80QAM | 80QAM | 80QAM |
| | | | | 24 | 80QAM | 80QAM | 64QAM |
| | | | | 16 | 80QAM | 64QAM | 64QAM |
| | | | | 8 | 64QAM | 64QAM | 64QAM |
| 7.25 | 7 | 29 | 160QAM | 64 | 160QAM | 160QAM | 160QAM |
| | | | | 48 | 160QAM | 160QAM | 128QAM |
| | | | | 32 | 160QAM | 128QAM | 128QAM |
| | | | | 16 | 128QAM | 128QAM | 128QAM |

MULTILEVEL DEMODULATION PROGRAM

FIG. 13

MODULATION DEVICE, DEMODULATION DEVICE, COMMUNICATION SYSTEM USING THE SAME, PROGRAM AND METHOD FOR IMPLEMENTING MODULATION AND DEMODULATION

BACKGROUND OF THE INVENTION

The present invention relates to a technique for multilevel (multivalued) modulation and demodulation, and in particular, to a multilevel modulation device in which transmitting data is assigned to a plurality of modulation symbols, a multilevel demodulation device, a communication system using the modulation and demodulation device, a program and a method for implementing the modulation and demodulation.

DESCRIPTION OF THE RELATED ART

Heretofore, a multilevel modulation system such as $2^n$QAM (n is a natural number), e.g., 4QAM (quadrature amplitude modulation), 16QAM, 32QAM, 64QAM, 128QAM, 256QAM and the like has been widely used especially in digital microwave communication, etc. The modulation system is generally employed because of its simple circuitry. Nowadays, effective utilization of frequency and transmission electric power is strongly required. In other words, there is a need to keep a frequency band used for a digital microwave communication line as narrow as possible so as to effectively realize required data transmission capacity. This requirement arises to improve such situation that, for example, while the 32QAM system is employed because the 16QAM system cannot satisfy required data transmission capacity, the 32QAM system has a too large data transmission capacity, that is, the frequency band is unnecessarily occupied.

As a countermeasure against the requirement, a "multi-valued modulation and demodulation communication method and a system thereof" has been disclosed in Japanese Patent Application Laid-Open No. HEI04-196945. In this application, there is proposed a general configuration in which a piece of inputted data is assigned to two or more modulation symbols (phase planes).

However in the prior art, only a general configuration is illustrated and there is not concretely disclosed how to assign inputted signal strings to the plural modulation symbols.

SUMMARY OF THE INVENTION

It is therefore the first object of the present invention to eliminate the problems in the prior art and to provide a multilevel modulation device and demodulation device capable of setting a modulation frequency more flexibly, a communication system using the same, a program and method for implementing the multilevel modulation and demodulation.

Moreover, it is the second object of the present invention to provide a multilevel modulation device and demodulation device capable of effectively utilizing a frequency and realizing a $2^{(n-0.75)}$QAM ($=2^{(n-1)+0.25}$QAM) with a required S/N (signal to noise) ratio smaller than that of the $2^n$QAM system, a communication system using the same, a program and a method for implementing the modulation and demodulation.

Further, it is another object of the present invention to provide a method for multilevel modulation for effectively exploiting a frequency and realizing a $2^{(p+q/n)}$QAM (p and n are arbitrary positive integers, and q is a positive integer smaller than n) with a required S/N ratio smaller than that of the $2^{(p+1)}$QAM system, a multilevel modulation device and demodulation device and a program thereof.

To achieve the objects, a multilevel modulation device according to the present invention converts an input data signal of 4p+1 bits into four signals each having p+1 bits, assigns the four signals to independent four phase planes, time-division multiplexes the four phase planes (signals) as one combination, and multilevel-modulates the signal for transmission. At this point, by establishing a predetermined rule of assignment of coordinate points to one pair of the four phase planes, there is realized the configuration wherein p+0.25 bits are assigned to one modulation symbol.

The present invention is intended to realize effective utilization of frequency and $2^{(p+q/n)}$QAM with a lower S/N ratio compared to $2^{(p+1)}$QAM system. According to a method for multilevel modulation of the present invention, n is set to an integer equal to or larger than 2, m is set to an integer equal to or more than 2, p is set to an arbitrary positive integer, q is set to an arbitrary positive integer smaller than n, M is set to an integer, which is not necessarily 2 raised to the power of a natural number, over and approximately equal to $2^{(p+q/n)}$, and a $2^{(np+q)}$ binary signal is assigned to n phase planes. M indicates signal points in the first phase plane, and is divided into m parts, namely, $M_{11}$, $M_{12}$, $M_{13}$, ..., $M_{1m}$. M, $M_{11}$, $M_{12}$, $M_{13}$, ..., $M_{1m}$ are integers and set so as to satisfy the following expression.

$$M = M_{11} + M_{12} + M_{13} + \ldots + M_{1m}$$

An i-th phase plane is provided with (n−1) pieces of signal points of $M_{ij}$ (i=2, 3, ... n, j=1, 2, 3, ... m) corresponding to the divided $M_{11}$, $M_{12}$, $M_{13}$, ... $M_{1m}$ in the first phase plane, respectively. $M_{ij}$ (i=1, 2, 3, ... n, j=1, 2, 3, ... m) is an integer smaller than M. Accordingly, the following expression is satisfied.

$$\begin{aligned}
N = &\, M_{11} \times M_{21} \times M_{31} \times \cdots \times M_{n1} + \\
&\, M_{12} \times M_{22} \times M_{32} \times \cdots \times M_{n2} + \\
&\, M_{13} \times M_{23} \times M_{33} \times \cdots \times M_{n3} + \cdots + \\
&\, M_{1m} \times M_{2m} \times M_{3m} \times \cdots \times M_{nm} \\
= &\, 2^{(np+q)}
\end{aligned}$$

Incidentally, N may be larger than $2^{(np+q)}$.

Consequently, a signal of total $2^{(np+q)}$ values is transmitted using the n phase planes, namely, a signal of $2^{(p+q/n)}$ values is transmitted with one phase plane on average. In other words, (p+q/n) bits are assigned per modulation symbol equivalently.

BRIEF DESCRIPTION OF THE DRAWINGS

The objects and features of the present invention will become more apparent from the consideration of the following detailed description taken in conjunction with the accompanying drawings in which:

FIG. 4 is an explanatory table showing a configuration of a data conversion table used by a first and second data converting circuits in the multilevel modulation device according to the first embodiment;

FIG. 5 is an explanatory diagram illustrating possible coordinate points taken by each modulation symbol on the phase planes for a multilevel modulation signal used in the first embodiment;

FIG. 6 is a table showing a concrete example of parameters used for configuring QAM systems according to another embodiment of the present invention;

FIG. 13 is a diagram showing a concrete example of parameters used for configuring QAM systems according to another embodiment of the present invention.

DESCRIPTION OF THE PREFERRED EMBODIMENTS

Figure 1:
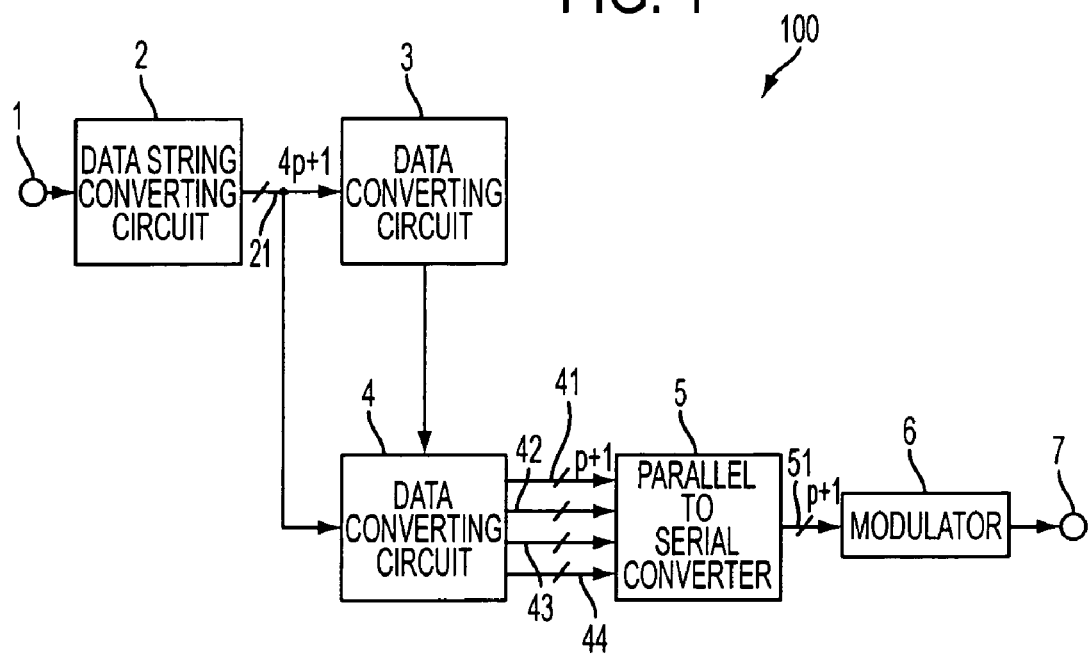
FIG. 1 is a block diagram showing a configuration of a multilevel modulation device according to a first embodiment of the present invention.

Referring now to the drawings, embodiments of the present invention are explained in detail.

According to a multilevel modulation system of the present invention, p is, for example, set to an integer equal to or more than 3 and an inputted signal of 4p+1 bits (strings) is assigned to four modulation symbols. In the first modulation symbol, a total of $(5/4)\times2^p$ signal points are used. When the first modulation symbol takes one of the predetermined 1st through $4\times2^{(p-3)}$th signal points, the respective second to fourth modulation symbols use one of $(5/4)\times2^p$ signal points, which is set in advance correspondingly to the inputted signal. When the first modulation symbol takes one of the $1+4\times2^{(p-3)}$th through $4\times2^{(p-3)}+3\times2^{(p-3)}$th signal points, the respective second to fourth modulation symbols use one of $(5/4)\times2^p$ signal points, one of $(5/4)\times2^p$ signal points, and one of $2^p$ signal points, each of which is set in advance correspondingly to the inputted signal. When the first modulation symbol takes one of the $1+4\times2^{(p-3)}+3\times2^{(p-3)}$th through $4\times2^{(p-3)}+3\times2^{(p-3)}+2\times2^{(p-3)}$th signal points, the respective second to fourth modulation symbols use one of $(5/4)\times2^p$ signal points, one of $2^p$ signal points, and one of $2^p$ signal points, each of which is set in advance correspondingly to the inputted signal. When the first modulation symbol takes one of the $1+4\times2^{(p-3)}+3\times2^{(p-3)}+2\times 2^{(p-3)}$th through $4\times2^{(p-3)}+3\times2^{(p-3)}+2\times2^{(p-3)}+2^{(p-3)}$th signal points, the respective second to fourth modulation symbols use one of $2^p$ signal points, which is set in advance correspondingly to the inputted signal. In the modulation system of the present invention, the following expression (1) is satisfied when p is set to an integer equal to or more than 3.

$$2^{(4p+1)} = \{(5/4)\times2^p\}\times\{(5/4)\times2^p\}\times\{(5/4)\times2^p\}\times\{4\times2^{(p-3)}\} + \{(5/4)\times2^p\}\times\{(5/4)\times2^p\}\times\{2^p\}\times\{3\times2^{(p-3)}\} + \{(5/4)\times2^p\}\times\{2^p\}\times\{2^{(p-3)}\} + \{2^p\}\times\{2^p\}\times\{2^p\}\times\{1\times2^{(p-3)}\} \quad (1)$$

The first term in the right side of the expression (1) indicates that $(5/4)\times2^p$QAM (Quadrature Amplitude Modulation) is executed to respective second, third and fourth signals when one of the $4\times2^{(p-3)}$ signal points is used in the first phase plane for a first signal. The second term thereof indicates that $(5/4)\times2^p$QAM, $(5/4)\times2^p$QAM, and $2^p$QAM are executed to the respective second, third and forth signals when one of the $3\times2^{(p-3)}$ signal points is used in the first phase plane for the first signal. The third term thereof indicates that $(5/4)\times2^p$QAM, $2^p$QAM, and $2^p$QAM are executed to the respective second, third and fourth signals when one of the $2\times2^{(p-3)}$ signal points is used in the first phase plane for the first signal. The fourth term thereof indicates that $2^p$QAM is executed to the respective second, third and fourth signals when one of the $1\times2^{(p-3)}$ signal points is used in the first phase plane for the first signal. Needless to say, the total of the signal points that can be taken in the first symbol is $(5/4)\times2^p$. That is, p+0.25 bits are assigned per modulation symbol. Thereby according to the present invention, it becomes possible to realize the QAM method wherein the number of multilevel is set to approximate $2^{(p+0.25)}$.

FIG. 1 is a block diagram showing a multilevel modulation device 100 according to a first embodiment of the present invention. The multilevel modulation device 100 comprises an input terminal 1, a data string number converting circuit 2, a first data converting circuit 3, a second data converting circuit 4, a parallel/serial converting circuit 5, a multilevel modulator 6 and an output terminal 7.

The first data converting circuit 3 and the second data converting circuit 4 converts an input data signal 21 of 4p+1 bits outputted from the data string number converting circuit 2. The first data converting circuit 3 outputs a signal of p+1 bits that indicates $(5/4)\times2^p$ different values according to the value of the input data signal 21. In response to the outputted signal from the first data converting circuit 3, the second data converting circuit 4 outputs four converted signals (output signals) 41 to 44 each having p+1 bits in reference to the value of the input data signal 21. When the first data converting circuit 3 outputs one of the 1 through $4\times2^{(p-3)}$ values, the second data converting circuit 4 determines the value as the first output signal, and outputs the second, third and fourth output signals each indicating predetermined one of the $(5/4)\times2^p$ different values. When the converting circuit 3 outputs one of the $1+4\times2^{(p-3)}$ to $4\times2^{(p-3)}+3\times2^{(p-3)}$ values, the converting circuit 4 determines the value as the first output signal, and outputs the second, third and fourth output signals that indicate predetermined one of the $(5/4)\times2^p$ different values, one of the $(5/4)\times2^p$ different values, and one of the $2^p$ different values, respectively. When the converting circuit 3 outputs one of the $1+4\times2^{(p-3)}+3\times2^{(p-3)}$ to $4\times2^{(p-3)}+3\times2^{(p-3)}+2\times2^{(p-3)}$ values, the converting circuit 4 determines the value as the first output signal, and outputs the second, third and fourth output signals that indicate predetermined one of the $(5/4)\times2^p$ different values, one of the $2^p$ different values, and one of the $2^p$ different values, respectively. When the converting circuit 3 outputs one of the $1+4\times2^{(p-3)}+3\times2^{(p-3)}+2\times2^{(p-3)}$ to $4\times2^{(p-3)}+3\times2^{(p-3)}+2\times2^{(p-3)}+2^{(p-3)}$ values, the converting circuit 4 determines the value as the first output signal, and outputs the second, third and fourth output signals each indicating predetermined one of the $2^p$ different values.

The parallel/serial converting circuit 5 inputs therein the output signals 41 to 44 from the second data converting circuit 4, and time-division multiplexes the signals 41 to 44 to output a multiplexed signal 51 of p+1 bits. The multilevel modulator 6 executes multilevel modulation to the multiplexed signal 51 and outputs it to the output terminal 7.

Figure 2:
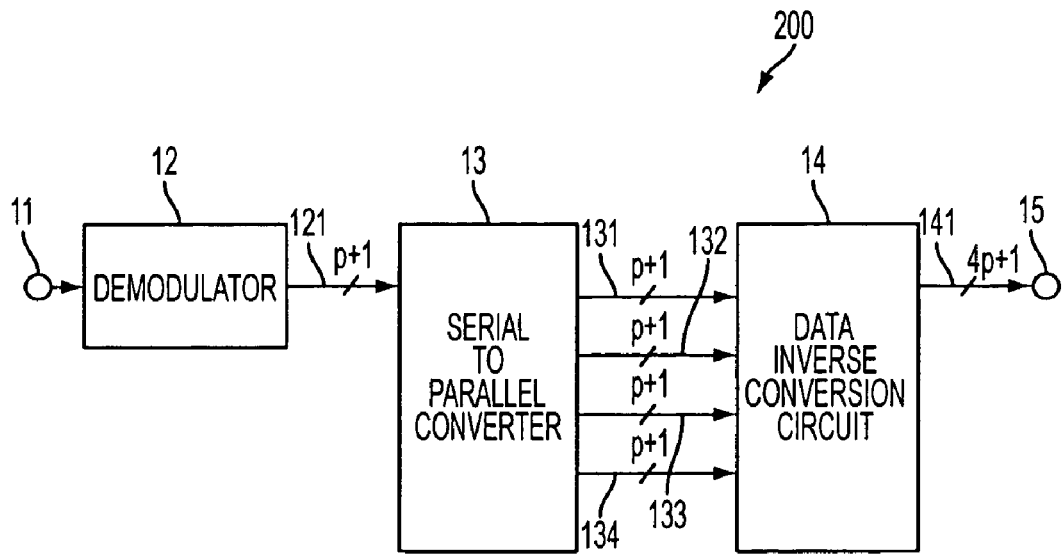
FIG. 2 is a block diagram showing a configuration of a multilevel demodulation device according to the first embodiment.

FIG. 2 is a block diagram showing a configuration of a multilevel demodulation device 200 according to the first embodiment of the present invention. The multilevel demodulation device 200 comprises an input terminal 11, a multilevel demodulator 12, a serial/parallel converting circuit 13, a data inverse conversion circuit 14, and an output terminal 15.

The multilevel demodulator 12 demodulates a communication signal inputted through the input terminal 11 to output a received and demodulated data string signal 121 of p+1 bits. The serial/parallel converting circuit 13 time-division demultiplexes the received and demodulated data string signal 121, which has been time-division multiplexed, to output first to fourth demodulated data string signals 131 to 134 each having p+1 bits. The data inverse conversion circuit 14 inputs therein the signals 131 to 134 to output a demodulated data signal 141 of 4p+1 bits. When the first demodulated data string signal 131 stands at one of the values from 1 to $4\times2^{(p-3)}$, the data inverse conversion circuit 14 receives the second to fourth demodulated data string signals 132 to 134 each indicating predetermined one of the $(5/4)\times2^p$ different values. When the first signal 131 stands at one of the values from $1+4\times2^{(p-3)}$ to $4\times2^{(p-3)}+3\times2^{(p-3)}$, the conversion circuit 14 receives the second to fourth signals 132 to 134 that indicate predetermined one of the $(5/4)\times2^p$ different values, one of the $(5/4)\times2^p$ different values, and one of the $2^p$ different values, respectively. When the first signal 131 stands at one of the values from $1+4\times2^{(p-3)}+3\times2^{(p-3)}$ to $4\times2^{(p-3)}+3\times2^{(p\times3)}+2\times2^{(p-3)}$, the conversion circuit 14 receives the second to fourth signals 132 to 134 that indicate predetermined one of the $(5/4)\times2^p$ different values, one of the $2^p$ different values, and one of the $2^p$ different values, respectively. When the first signal 131 stands at one of the values from $1+4\times2^{(p-3)}+3>\times2^{(p-3)}+2\times2^{(p-3)}$ to $4\times2^{(p-3)}+3\times2^{(p-3)}+2\times2^{(p-3)}+2^{(p-3)}$, the conversion circuit 14 receives the second to fourth signals 132 to 134 each indicating predetermined one of the $2^p$ different values. Subsequently, the conversion circuit 14 generates predetermined demodulated data values based on the values indicated by the first to fourth demodulated data string signals 131 to 134, respectively, to output a demodulated data signal of 4p+1 bits indicating the demodulated data values.

In the following, an explanation is given of the operation of the multilevel modulation device 100 and demodulation device 200 used in the first embodiment of the present invention in reference to the drawings.

Figure 3:
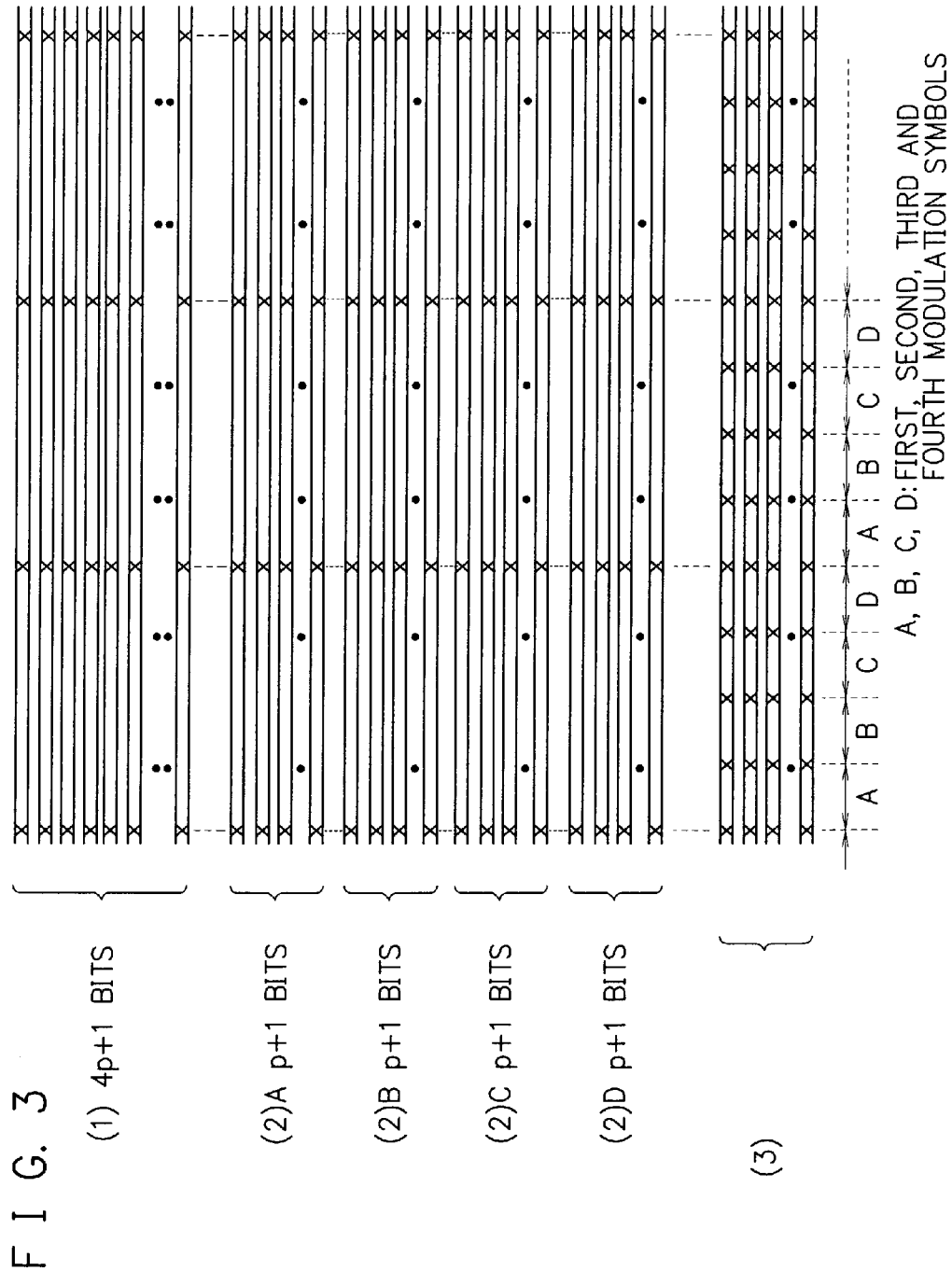
FIG. 3 is a timing chart showing signal transformation in each section in the multilevel modulation device according to the first embodiment.

FIG. 3 is a timing chart showing signal transformation in each section (circuit) in the multilevel modulation device 100 used in the first embodiment. In FIG. 3, (1) shows the input data signal 21. The horizontal axis is a time axis, and indicates that the input data signal 21 transforms its pulse at regular time intervals. (2)A, (2)B, (2)C, and (2)D indicate the first to fourth output signals 41 to 44, respectively, outputted from the second data converting circuit 4 shown in FIG. 1. (3) indicates the multiplexed signal 51 outputted from the parallel/serial converting circuit 5 shown in FIG. 1. In addition, (3) shows a state where the signals (2)A, (2)B, (2)C, and (2)D are time-division multiplexed, that is, the signals (2)A, (2)B, (2)C, and (2)D are divided and outputted during the periods A, B, C, and D as shown in (3) in FIG. 3, respectively.

FIG. 4 shows a correspondence between possible values indicated by the input data signal 21 (which is a binary signal) of 4p+1 bits (the column of "input signal numbers" shown in FIG. 4) and values indicated by the signal outputted to the output terminal 7 (the column of "possible signal points taken in the modulation symbols" shown in FIG. 4), for example, when p=4, namely, when the input data signal 21 is 17 strings of 17 bit configuration.

In reference to FIG. 4, the first modulation symbol among the four modulation symbols takes values from 1 to 20. When the first modulation symbol takes one of the values from 1 to 8, the second to fourth modulation symbol take one of the values from 1 to 20, respectively. When the first modulation symbol takes one of the values from 9 to 14, the second, third and fourth modulation symbols take one of the values from 1 to 20, 1 to 20, and 1 to 16, respectively. When the first modulation symbol takes one of the values from 15 to 18, the second, third and fourth modulation symbols take one of the values from 1 to 20, 1 to 16, and 1 to 16, respectively. When the first modulation symbol takes either value 19 or 20, the second to fourth modulation symbols take one of the values from 1 to 16, respectively.

Set out by the following expression (2) are varieties of signals that can be represented by the four modulation symbols at this point.

$$8\times20\times20\times20+6\times20\times20\times16+4\times20\times16\times16+2\times16\times16\times16=131072(=2^{17}) \quad (2)$$

In the above expression (2), "8" in the first term of "8×20×20×20" indicates that the first modulation symbol takes one of the values form 1 to 8, and "20×20×20" thereof indicates that the second to fourth modulation symbols take one of the values from 1 to 20, respectively, according to the value taken by the first modulation symbol. "6" in the second term of "6×20×20×16" indicates that the first modulation symbol takes one of the values from 9 to 14, and "20×20×16" thereof indicates that the second, third and fourth modulation symbols take one of the values from 1 to 20, 1 to 20, and 1 to 16, respectively, according to the value taken by the first modulation symbol. "4" in the third term of "4×20×16×16" indicates that the first modulation symbol takes one of the values from 15 to 18, and "20×16×16" thereof indicates that the second, third and fourth modulation symbols take one of the values from 1 to 20, 1 to 16, and 1 to 16, respectively, according to the value taken by the first modulation symbol. "2" in the fourth term of "2×16×16×16" indicates that the first modulation symbol takes either value 19 or 20, and "16×16×16" thereof indicates that the second to fourth modulation symbols take one of the values from 1 to 16, respectively, according to the value taken by the first modulation symbol.

By this means, the correspondence between the input data signal and the value (signal point) taken by the respective first to fourth modulation symbols can be uniquely set. Thereby, the first and second data conversion circuits may realize the conversion by, for example, referring a predetermined data table that may be stored in a ROM (Read Only Memory) device, etc. Incidentally, while FIG. 4 shows a case where p=4, the present invention is applicable to the case where p is set to an integer equal to or more than 3.

FIG. 5 is a signal diagram illustrating, as what is called constellations on phase planes, possible signal points taken by the first to fourth modulation symbols for the modulated signal outputted from the multilevel modulator 6. In FIG. 5, there are shown possible coordinate points taken by the first to fourth modulation symbols with black. The four sections from the top in FIG. 5 correspond to the first to fourth terms of the expression (2), respectively. In other words, in the section "8 points of the first modulation symbol", possible coordinate points taken by the first to fourth modulation symbols are marked by black on the four constellations from the left, respectively, which correspond to the first term of the left side of the expression (2). In the same manner, in the section "6 points of the first modulation symbol", possible coordinate points taken by the first to fourth modulation symbols are marked by black on the constellations from the left, respectively, which correspond to the second term thereof. In the section "4 points of the first modulation symbol", possible coordinate points taken by the first to fourth modulation symbols are marked by black on the constellations from the left, respectively, which correspond to the third term thereof. In the section "2 points of the first modulation symbol", possible coordinate points taken by the first to fourth modulation symbols are marked by black on the constellations from the left, respectively, which correspond to the fourth term thereof.

While in the above embodiment, the present invention is disclosed in general form practicable in the case where p is set to an integer equal to or more than 3, there are shown concrete examples in the case where p=3 through 7 in FIG. 6. Namely, FIG. 6 shows parameters to realize 10QAM, 20QAM, 40QAM, 80QAM, and 160QAM.

FIG. 6 shows numbers of multilevel and the number of repetition thereof in the first to fourth modulation symbols. Assuming that communication is being established at the transmission rate of 150 [Mbps] with a frequency band in which modulation rate (symbol rate) is equivalent to 36 [Msymbol/sec], when employing 32QAM for the communication, the modulation rate is 30.0 [Msymbol/sec], thereby leading to existence of unused portion of the frequency band. However, when employing 16QAM for the communication, the modulation rate is 37.5 [Msymbol/sec], thereby causing insufficiency of the frequency band. To solve the problem, if 20QAM shown in FIG. 6 is employed, the modulation rate of 35.3 [Msymbol/sec] can be secured, thus enabling efficient communication with optimum utilization of the frequency band.

Moreover, while the 32QAM requires a C/N (carrier to noise) ratio of 23.9 [dB] to realize a code error ratio at $10^{-6}$, the 20 QAM according to the present invention requires a C/N ratio of 22.1 [dB] for the same purpose, thereby enabling the communication with the same quality even if reducing the transmission electric power by 1.8 [dB] (23.9−22.1=1.8 [dB]). Therefore, it becomes possible to effectively utilize the electric power.

In the following, an explanation will be further given of a multilevel modulation method according to another embodiment of the present invention.

According to this embodiment, the multilevel modulation device and demodulation device used in the first embodiment further include control means, respectively. Further, the multilevel modulation device and demodulation device may include ROM (or the other recording medium) to set up data conversion tables therein, respectively. The data conversion tables stored in the ROMs may be changed by the control means. By changing the data conversion tables in the modulation device and demodulation device correspondingly and reciprocally, it becomes possible to arbitrarily change the relationship between a value of data to be exchanged and a communication signal (coordinate points on constellations). Consequently, it becomes possible to infallibly maintain secrecy of exchanged data and enhance reliability of the communication system.

Figure 7:
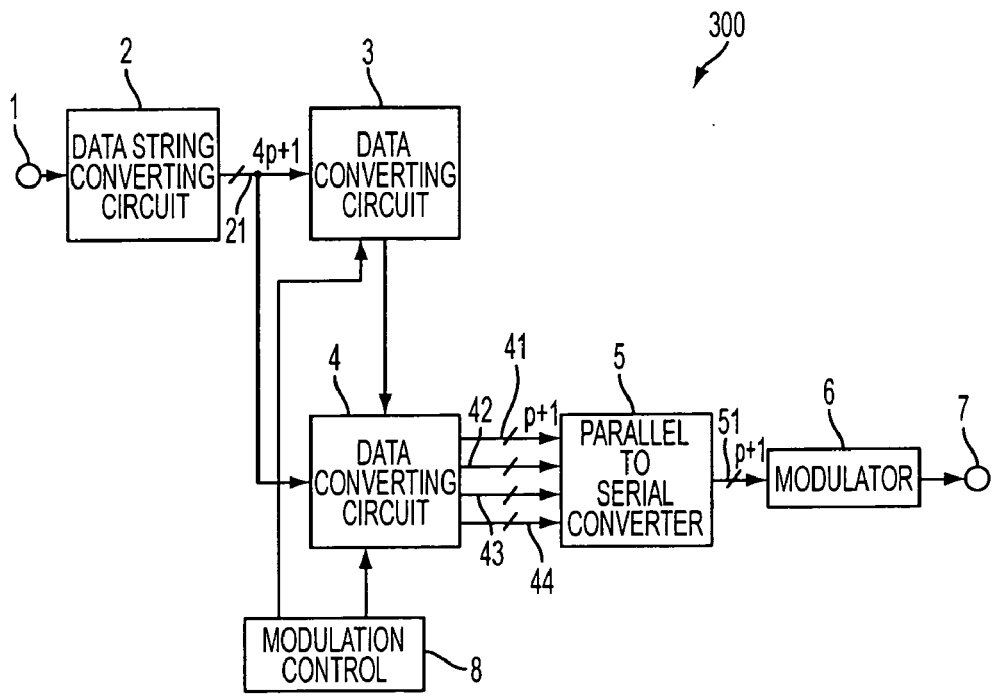
FIG. 7 is a block diagram showing a configuration of a multilevel modulation device according to another embodiment of the present invention.

In reference to FIG. 7, a multilevel modulation device 300 comprises a multilevel modulation control means 8 in addition to the sections (circuits) comprised in the multilevel modulation device 100 shown in FIG. 1. The same reference numbers represent the same parts in FIGS. 1 and 7. The multilevel modulation control means 8 controls the first data converting circuit 3 and the second data converting circuit 4, and alters information in the data conversion tables (not shown) stored in the respective circuits 3 and 4.

Figure 8:
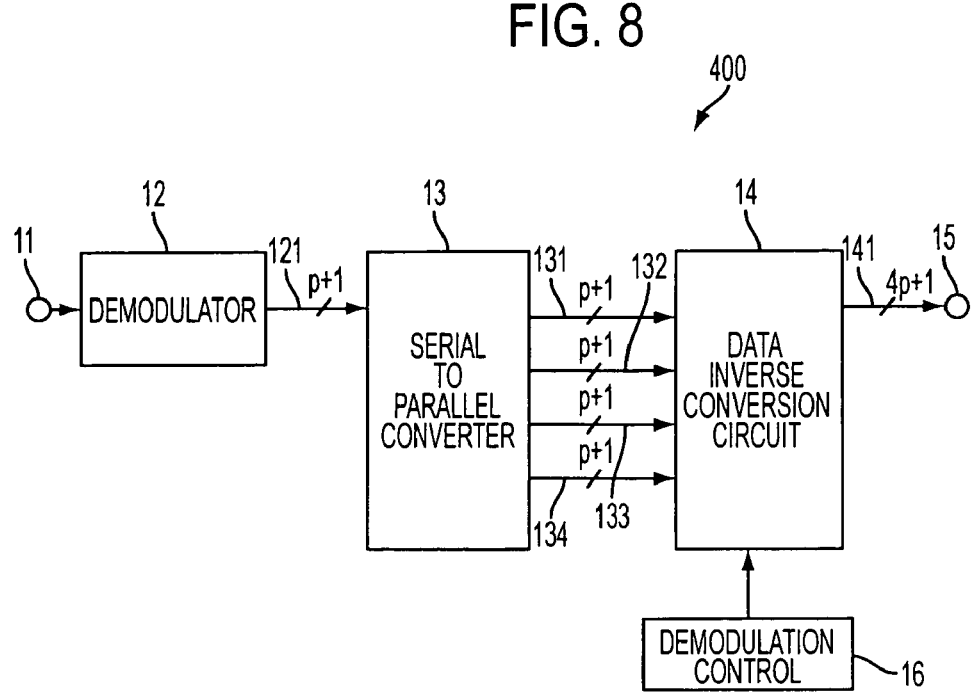
FIG. 8 is a block diagram showing a configuration of a multilevel demodulation device according to the embodiment of the present invention.

In reference to FIG. 8, a multilevel demodulation device 400 comprises a multilevel demodulation control means 16 in addition to the sections (circuits) comprised in the multilevel demodulation device 200 shown in FIG. 2. The same reference numbers represent the same parts in FIGS. 2 and 8. The multilevel demodulation control means 16 controls the data inverse conversion circuit 14, and alters information in a data inverse conversion table (not shown) stored in the circuit 14.

Incidentally, the multilevel modulation control means 8 may include the first and second data converting circuits 3 and 4 as an input and output device thereof, and execute the data converting function, which would be executed by the converting circuits 3 and 4, by a computer that configures the control means 8. In this case, the control means 8 is provided with a control program for executing the data converting processes in behalf of the circuits 3 and 4.

Figure 9:
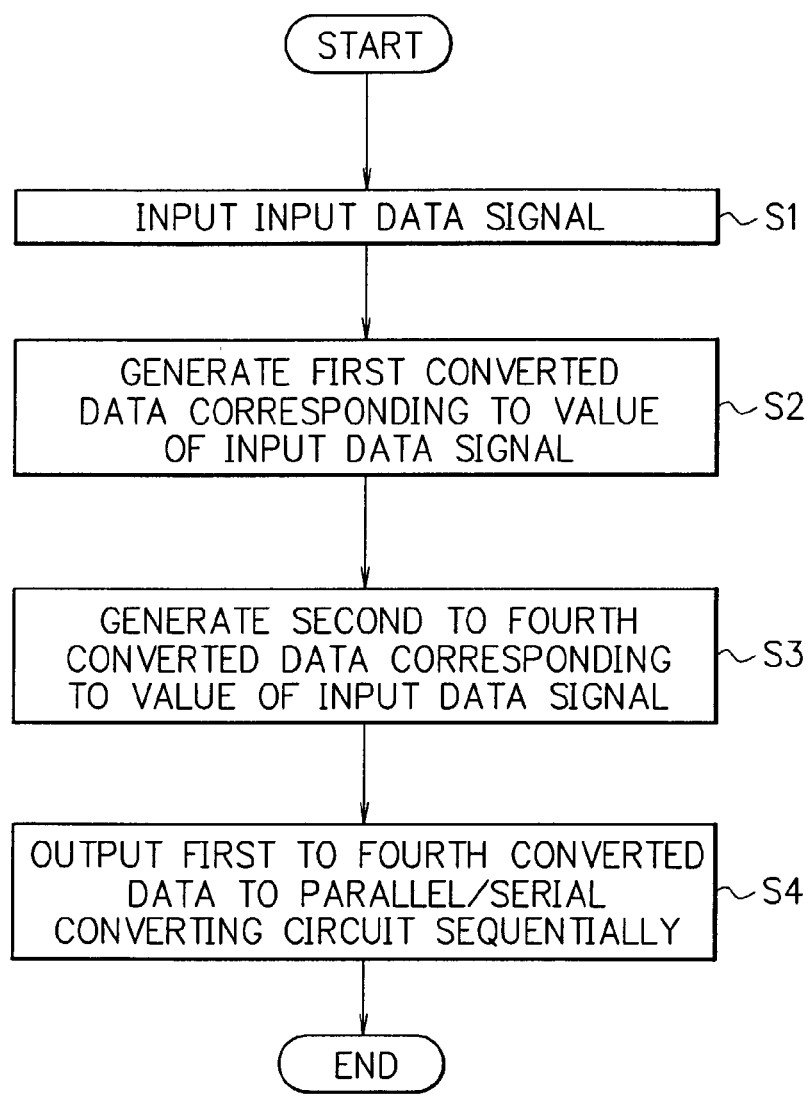
FIG. 9 is an example of a flowchart showing program behavior executed by a computer included in a multilevel modulation control means in the multilevel modulation device according to the embodiment of the present invention.

FIG. 9 is a flow chart showing program behavior executed by the computer included in the multilevel modulation control means 8 with this configuration. First, the control means 8 inputs therein the input data signal 21 (Step S1). Subsequently, the control means 8 generates a first converted data (signal) corresponding to the value of the signal 21 (Step S2). After that, the control means 8 generates second to fourth converted data (Step S3). The control means 8 may generate the first to fourth converted data in reference to the data conversion table shown in FIG. 4, for example. Subsequently, the control means 8 outputs the first to fourth converted data to the parallel/serial converting circuit 5 sequentially (Step S4). Incidentally, while FIG. 9 shows a case where a piece of input data is processed for simplicity, input data signals are fed therein sequentially as shown in the timing chart shown in FIG. 3. Thereby, the computer in the control means 8 repeatedly executes the processes shown in FIG. 9 to process the continuously inputted signals and output the converted data (signals) sequentially.

In the same manner, the multilevel demodulation control means 16 may include the data inverse conversion circuit 14 as an input and output device thereof, and execute the data inverse converting function, which would be executed by the circuit 14, by a computer that configures the control means 16. In this case, the control means 16 is provided with a control program for executing the data inverse converting processes in behalf of the circuit 14.

Figure 10:
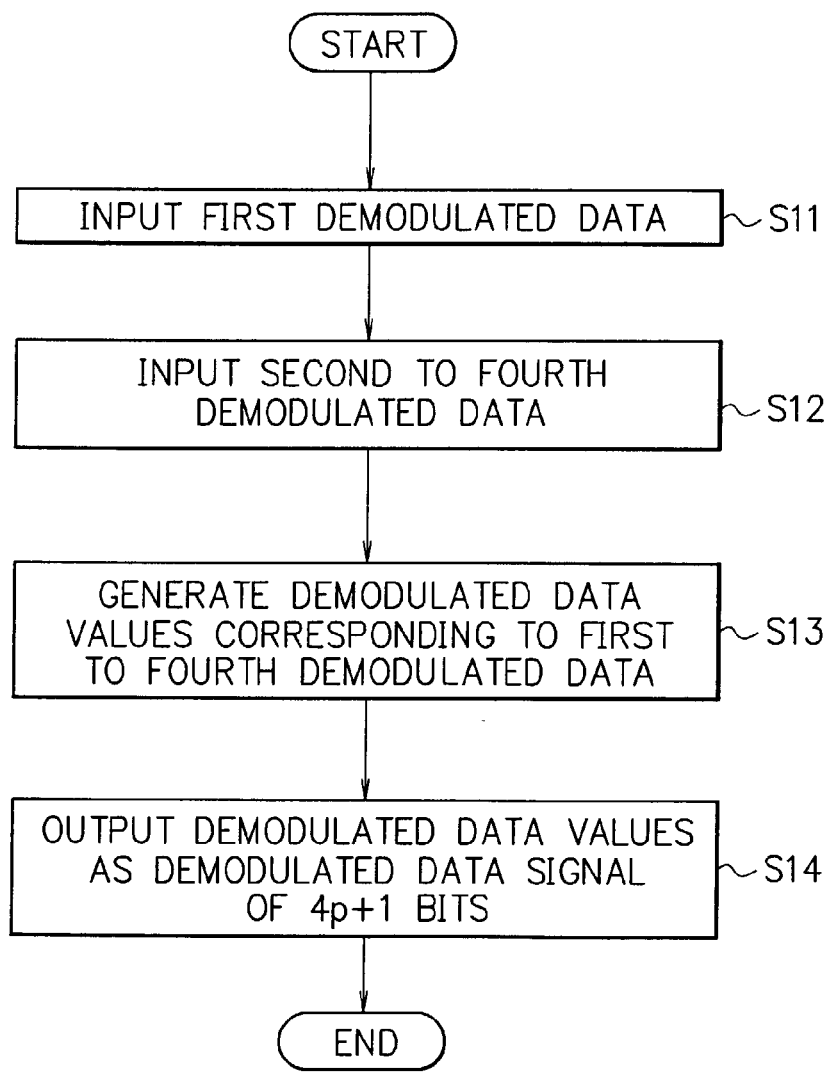
FIG. 10 is an example of a flowchart showing program behavior executed by a computer included in a multilevel demodulation control means in the multilevel demodulation device according to the embodiment of the present invention.

FIG. 10 is a flow chart showing program behavior executed by the computer included in the multilevel demodulation control means 16 with this configuration. First, the control means 16 inputs therein the first demodulated data (Step S11), and inputs therein the second to fourth demodulated data (Step S12). Subsequently, the control means 16 generates demodulated data values corresponding to the first to fourth demodulated data (Step S13). The control means 16 may generate the demodulated data values in reference to an inverse conversion table made based on the data conversion table shown in FIG. 4, for example. Finally, the control means 16 outputs the demodulated data values as a demodulated data signal of 4p+1 bits (Step S14). Incidentally, while FIG. 10 shows a case where a set of demodulated data is inputted and inversely converted for simplicity, it is apparent that many sets of demodulated data are fed therein sequentially. Thereby, the computer in the control means 16 repeatedly executes the processes shown in FIG. 10 to process the continuously inputted data and output the demodulated data signals sequentially.

Incidentally, while FIGS. 1 and 7 show an example of configuration wherein the first and second data converting circuits 3 and 4 are independent, those two converting circuits may be configured with one circuit.

Moreover in the above-described embodiments, while the second data converting circuit 4 shown in FIG. 1 outputs four pieces of data of p+1 bits in parallel, the present invention will not be limited to the configuration, namely, the data may be multiplexed for transmission. In the same manner, while the serial/parallel converting circuit 13 shown in FIG. 2 outputs four pieces of data of p+1 bits in parallel, the data may be multiplexed.

In this embodiment, the converting circuit 4 outputs the first to fourth converted data according to the relationship between the input data signal and the converted data (modulation symbols) as shown in FIG. 4, for example. Namely, the converting circuit 4 inputs therein the input signal that indicates one of the $2^{(4p+1)}$ different values, for example, one of the values from 1 to $2^{(4p+1)}$ (p=4 in the example shown in FIG. 4), and output four converted data. The input data signal is classified into one of predetermined four groups each having disparate parameters according to its value (when p=4, the four groups consists of a group of 1 to 64000, a group of 64001 to 102400, a group of 102401 to 122880, and a group of 122881 to 131072 as shown in FIG. 4).

When the value of the input signal belongs the first group (when p=4 and the input signal indicates one of input signal values from 1 to 64000), the first converted data (the first modulation symbol) indicates one of the values from 1 to $4\times2^{(p-3)}$ (when p=4, one of the values from 1 to 8) according to the value of the input signal. In this case, each of the second, third and fourth converted data (the second, third and fourth modulation symbols) indicates one of the values from 1 to $(5/4)\times2^p$ (when p=4, one of the values from 1 to 20), respectively. Thereby, for the input signal included in the first group, there are made $5^3\times2^{(4p-7)}$ different combinations (when p=4, there are 64,000 combinations) with the first through fourth converted data.

When the value of the input signal belongs to the second group (when p=4 and the input signal indicates one of input signal values from 64001 to 102400), the first converted data indicates one of the values from $1+4\times2^{(p-3)}$ to $4\times2^{(p-3)}+3\times2^{(p-3)}$ (when p=4, one of the values from 9 to 14). In this case, the second, third and fourth converted data indicate one of the values from 1 to $(5/4)\times2^p$ (when p=4, one of the values from 1 to 20), 1 to $(5/4)\times2^p$, and 1 to $2^p$ (when p=4, one of the values from 1 to 16), respectively, according to the value of the input signal. Thereby, for the input signal included in the second group, there are made $3\times5^2\times2^{(4p-7)}$ different combinations (when p=4, there are 38,400 combinations) with the first through fourth converted data.

When the value of the input signal belongs to the third group (when p=4 and the input signal indicates one of input signal values from 102401 to 122880), the first converted data indicates one of the values from $1+4\times2^{(p-3)}+3\times2^{(p-3)}$ to $4\times2^{(p-3)}+3\times2^{(p-3)}+2\times2^{(p-3)}$ (when p=4, one of the values from 15 to 18). In this case, the second, third and fourth converted data indicate one of the values from 1 to $(5/4)\times2^p$, 1 to $2^p$, and 1 to $2^p$, respectively. Thereby, for the input signal included in the third group, there are made $5\times2^{(4p-4)}$ different combinations (when p=4, there are 20,480 combinations) with the first through fourth converted data.

When the value of the input signal belongs to the fourth group (when p=4 and the input signal indicates one of input signal values from 122881 to 131072), the first converted data indicates one of the values from $1+4\times2^{(p-3)}+3\times2^{(p-3)}+2\times2^{(p-3)}$ to $4\times2^{(p-3)}+3\times2^{(p-3)}+2\times2^{(p-3)}+2^{(p-3)}$ (when p=4, either value 19 or 20). In this case, each of the second, third and fourth converted data indicates predetermined one of the values from 1 to $2^p$ according to the value of the input data signal, respectively. Thereby, for the input signal included in the fourth group, there are made $2^{(4p-3)}$ different combinations (when p=4, there are 8,192 combinations) with the first through fourth converted data. The converting processes according to this embodiment can be realized with the program executed by the computer.

In the following, the above-described $2^{(4p+1)}$ multilevel modulation system is summarized before an explanation is given of a general $2^{(p+q/n)}$ multilevel modulation system.

In the above-described embodiment, the number of the signal points (M) used in the first phase plane is set to $(5/4)\times2^p$ (in the example shown in FIG. 5, M=20), and the number of the signal points M is divided into m parts. In the example shown in FIG. 5, the signal points M in the first phase plane is divided into 4 parts (m=4), that is, $M_{11}$ (=8, which means that the first modulation symbol takes one of the 8 signal points as shown in FIG. 5), $M_{12}$ (=6, which means that the first modulation symbol takes one of the 6 signal points), $M_{13}$ (=4, which means that the first modulation symbol takes one of the 4 signal points), and $M_{14}$ (=2, which means that the first modulation symbol takes one of the 2 signal points). In this case, the following expression is satisfied.

$$M=M_{11}30\ M_{12}+M_{13}+M_{14} \text{ (namely, } 20=8+6+4+2\text{)}$$

Also in the second, third and fourth phase planes, $M_{ij}$ (i=2, 3, 4, j=1, 2, 3, 4) is assigned as the signal points that can be used in the three phase planes corresponding to the respective $M_{11}$, $M_{12}$, $M_{13}$ and $M_{14}$ which are obtained by dividing the total signal points in the first phase plane into 4 parts, respectively.

In the example shown in FIG. 5, $(M_{11}, M_{12}, M_{13}, M_{14})$=(8, 6, 4, 2)

$(M_{21}, M_{22}, M_{23}, M_{24})$=(20, 20, 20, 16)

$(M_{31}, M_{32}, M_{33}, M_{34})$=(20, 20, 16, 16), and $(M_{41}, M_{42}, M_{43}, M_{44})$=(20, 16, 16, 16).

Incidentally, $M_{ij}$ indicates an integer equal to or less than M (=20).

When the products of the numbers of $M_{ij}$ (i=1 through 4), namely, the products of $M_{1j}\times M_{2j}\times M_{3j}\times M_{4j}$, where j=1 through 4 are added up, the sum N becomes equal to 131072 ($=2^{(4\times 4+1)}=2^{17}$).

$$N = M_{11} \times M_{21} \times M_{31} \times M_{41}(= 8\times 20\times 20\times 20) +$$
$$M_{12} \times M_{22} \times M_{32} \times M_{42}(= 6\times 20\times 20\times 16) +$$
$$M_{13} \times M_{23} \times M_{33} \times M_{43}(= 4\times 20\times 16\times 16) +$$
$$M_{14} \times M_{24} \times M_{34} \times M_{44}(= 2\times 16\times 16\times 16) +$$
$$= 131072(= 2^{(4\times 4+1)})$$

In the above expression, the total N obtained by adding up the respective products of $M_{1j} \times M_{2j} \times M_{3j} \times M_{4j}$ where j=1 through 4 may not be exactly equal to the value of 131072 ($=2^{(4\times 4+1)}$). In other words, the total N is allowed to be over the value to some extent.

Based on the principle, an explanation is given of an embodiment of the present invention when m and n are set to arbitrary integers equal to or more than 2, respectively. To realize a multilevel modulation for transmitting a signal with approximate $2^{(p+q/n)}$ value per phase plane, that is, for transmitting (p+q/n) bits per symbol, n is set to an integer equal to or more than 2, m is set to an integer equal to or more than 2, p is set to an arbitrary natural number, q is set to an arbitrary natural number smaller than n, M is not necessarily set to 2 raised to the power of a natural number ($2^p$), and an integer over and nearly equal to $2^{(p+q/n)}$, and a binary signal of $2^{(n\times p+q)}$ is assigned to n phase planes.

Figure 11:
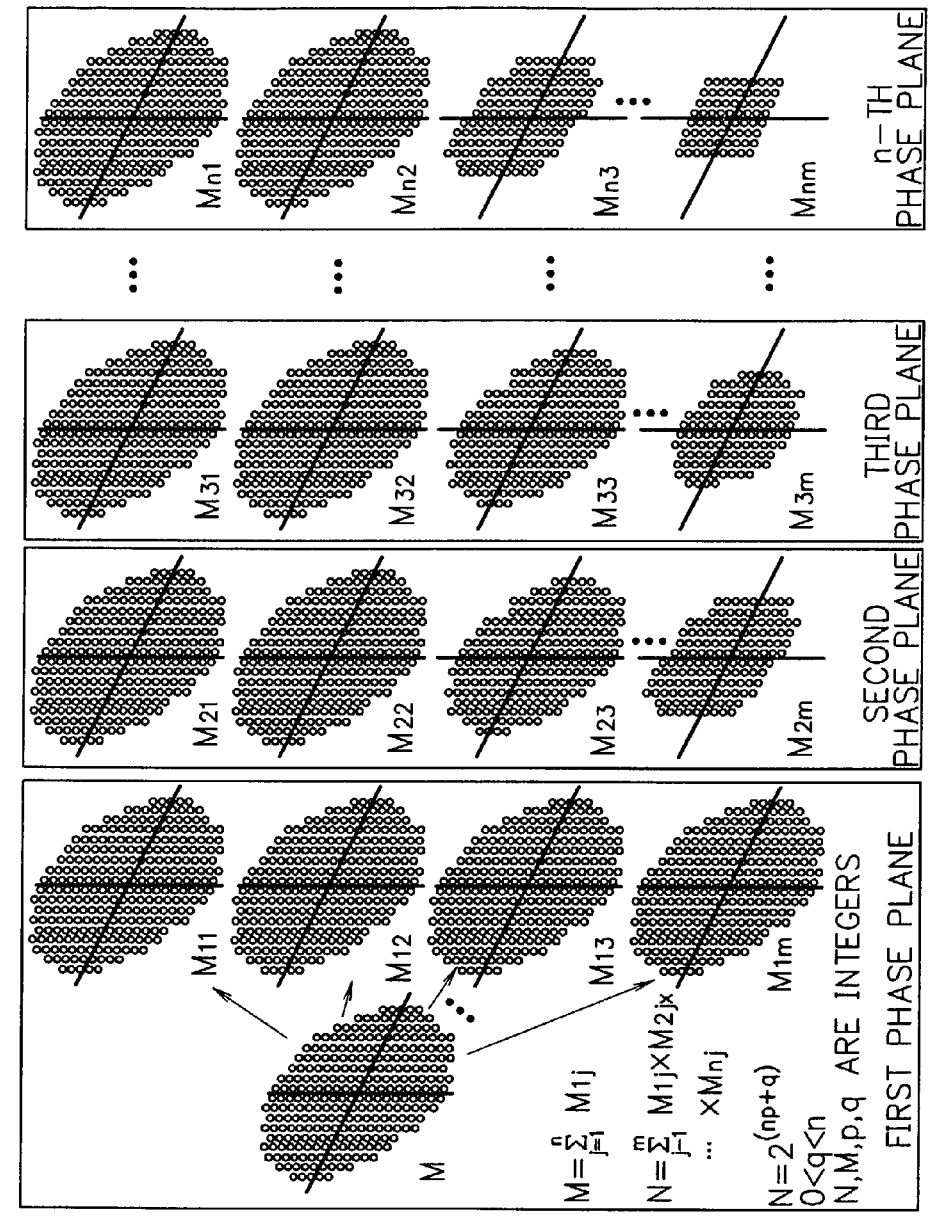
FIG. 11 is an explanatory diagram illustrating possible coordinate points on constellation for a multilevel modulation signal used in another embodiment.

In the following, an explanation is given of the general outline and embodiment of the present invention. As described above, n is set to an integer equal to or more than 2, m is set to an integer equal to or more than 2, p is set to an arbitrary natural number, q is set to an arbitrary natural number smaller than n, and M is set to an integer, which is not necessarily a number of times of 2 with a natural number and allowed to be set to an integer over $2^{(p+q/n)}$ (M is set to an integer larger than the integer part of $2^{(p+q/n)}$ and smaller than $2^{(p+1)}$). FIG. 11 shows the principle of this embodiment. In FIG. 11, the data converting circuit inputs therein an input data signal that can indicate $2^{(n\times p+q)}$ different values, for example, one of the values from 1 to $2^{(n\times p+q)}$, and outputs the first to n-th converted data. When the signal points used in the first phase plane for the first converted data are described as M and the M is divided into m groups (parts), that is, $M_{11}, M_{12}, M_{13}, \ldots M_{1m}$, the following relationship is satisfied.

$$M = M_{11} + M_{21} + M_{31} + \ldots + M_{n1}$$

The signal points described as $M_{ij}$ (i=2, 3, ... n, j=1, 2, 3, ... m) are assigned in the second, third, ..., and n-th phase planes corresponding to the respective divided m groups of the first phase plane. Incidentally, all $M_{ij}$ is an integer smaller than M. Moreover, the following expression is satisfied.

$$N = M_{11} \times M_{21} \times M_{31} \times \cdots \times M_{n1} +$$
$$M_{12} \times M_{22} \times M_{32} \times \cdots \times M_{n2} +$$
$$M_{13} \times M_{23} \times M_{33} \times \cdots \times M_{n3} + \cdots +$$
$$M_{1m} \times M_{2m} \times M_{3m} \times \cdots \times M_{nm}$$
$$= 2^{(np+q)}$$

The value described as N may not be equal to $2^{(np+q)}$ correctly, and allowed to be over $2^{(np+q)}$ to some extent.

Accordingly, a signal of $2^{(np+q)}$ values is totally transmitted with n phase planes. This means that a signal of $2^{(p+q/n)}$ values is transmitted with one phase plane on average. That is, there is realized transmission with (p+q/n) bits per symbol.

Figure 12:
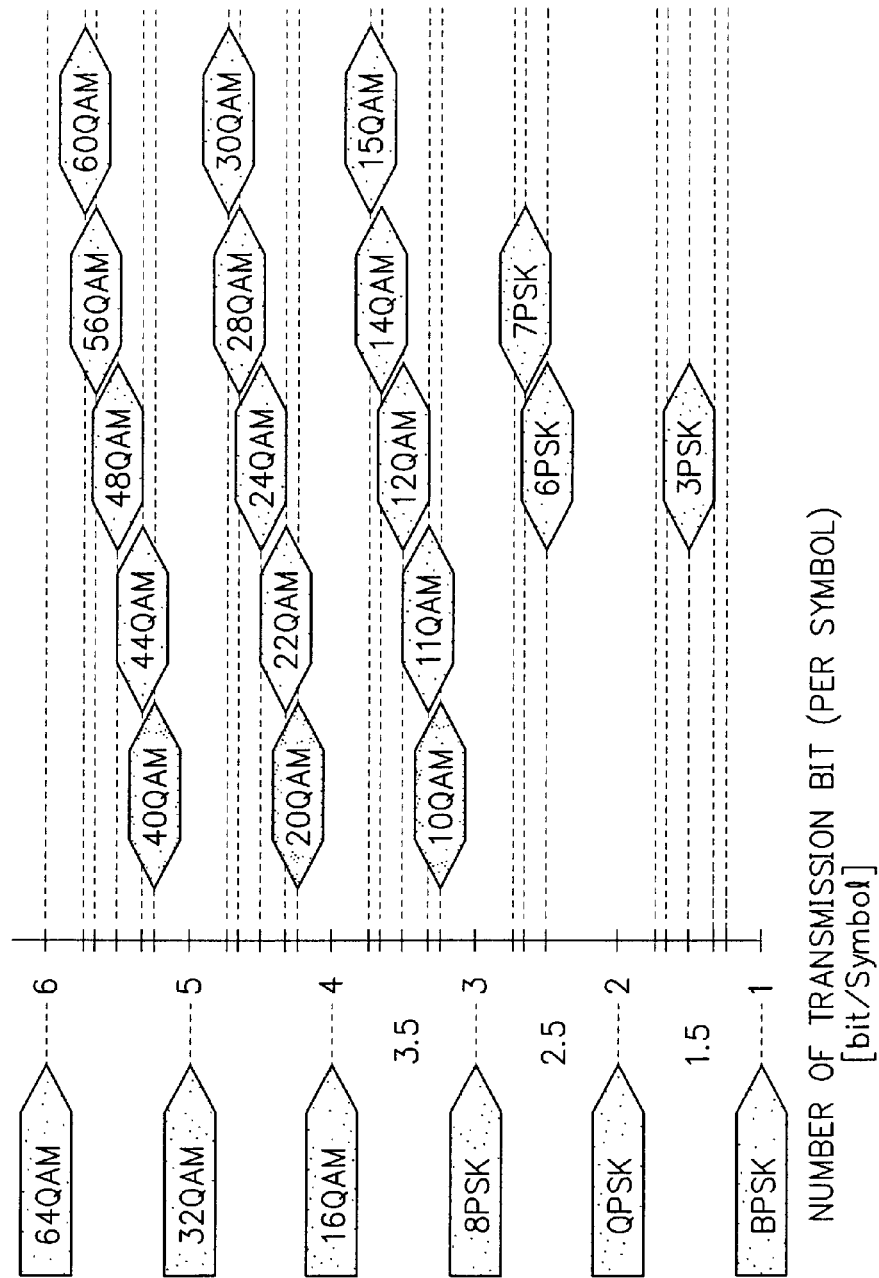
FIG. 12 is a diagram for explaining intermediate multilevel transmission compared to $2^n$ QAM according to the embodiment.

As shown in FIG. 12, compared to the $2^n$QAM such as 16QAM, 32QAM, 64QAM, etc., there is realized QAM with an intermediate value therebetween by this embodiment. Incidentally in FIG. 12, BPSK (Binary Phase Shift Keying) employs a transmission system wherein a phase of a carrier is changed between 0 and π corresponding to "1" and "0" of transmitting data, respectively. In the BPSK, 1 bit is transmitted per 1 symbol. Moreover, in QPSK (Quadrature Phase Shift Keying) employs a transmission system wherein four kinds of phases are used to transmit information of 2 bits per symbol. Further, for example, with 3PSK, approximate 1+1/2 bits are transmitted per symbol.

According to this embodiment, it becomes possible to provide a multilevel transmission system of an intermediate number of multilevel, which is applicable to a case where frequency band is too wide for performing $2^p$QAM and too narrow for $2^{(p-1)}$QAM. Consequently, it becomes possible to effectively utilize the frequency band and to realize $2^{(p-\alpha)}$ QAM (0<α<1) with a required S/N ratio lower than that of $2^p$QAM, thus enabling effective utilization of electric power.

Figure 13:
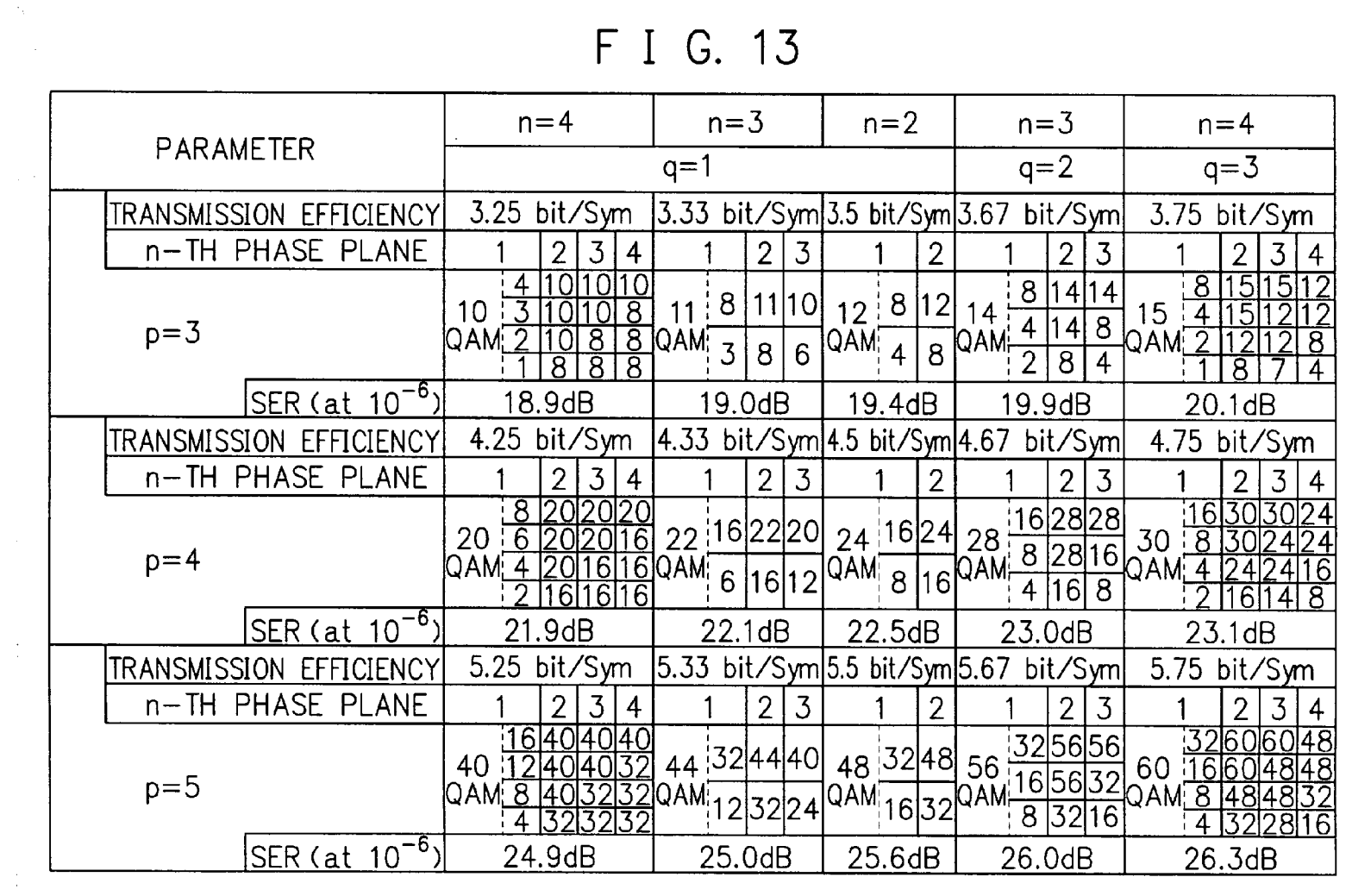

FIG. 13 shows SER (Symbol Error Rate) with respect to each multilevel modulation system shown in FIG. 12 with parameters to realize thereof. The parameters are modified to realize extended QAM systems (not shown) described later. Incidentally, in FIG. 13, when n=3, q=2, and p=3, 14QAM is employed for data transmission. In reference to the section of 14QAM in FIG. 13, the first column gives 8, 4 and 2, the second column shows 14, 14 and 8, and the third column gives 14, 8 and 4 from the top. To be concrete, 14 signal points used in the first phase plane are divided into 8, 4 and 2 signal points (as shown in the first column). While one of the 8 signal points is used in the first phase plane, 14QAM is executed in the second and the third phase planes, respectively. While one of the 4 signal points is used therein, 14QAM and 8QAM are executed in the second and the third phase planes, respectively. While one of the 2 signal points is used therein, 8QAM and 4QAM are executed in the second and the third phase planes, respectively. Incidentally, the 8, 4 and 2 signal points are divided so as not to overlap to each other. Further, when each of the numbers are reduced to half, that is, n=3, q=2, and p=2, 7QAM is employed for data transmission (not described in FIG. 13). In this case, the first column shows 4, 2 and 1, the second column gives 7, 7 and 4, and the third column shows 7, 4 and 2 from the top. To be concrete, 7 signal points used in the first phase plane are divided into 4, 2 and 1 signal points (as described in the first column). While one of the 4 signal points is used in the first phase plane, 7QAM is executed to the respective second and third phase planes. While either of the 2 signal points is used therein, 7QAM and 4QAM are executed in the second and third phase planes, respectively. While 1 signal point is used therein, 4QAM and 2QAM are executed in the second and third phase planes, respectively. Incidentally in FIG. 12, to realize 6PSK, n is set to 2, q is set to 1, and p is set to 2.

From an electric power stand point, 16QAM with transmission efficiency of 4 bit/Symbol is realized with the C/N ratio of 20.9 dB to satisfy the symbol error rate at $10^{-6}$.

When there exist unused portion of the frequency band, 12QAM with transmission efficiency of 3.5 bit/Symbol may be employed. The 12QAM is realized with a C/N ratio of 19.4 dB to satisfy the same symbol error rate at $10^{-6}$. Thereby, compared to the 16QAM, it becomes possible to guarantee the same transmission quality as that of the 16QAM with 1.5 dB less electric power (20.9−19.4=1.5 dB).

On the other hand, if 24QAM with transmission efficiency of 4.5 bit/Symbol is employed, the 24QAM can be realized with a C/N ratio of 22.5 dB to satisfy the symbol error rate at $10^{-6}$. Thereby, it becomes possible to enhance the transmission efficiency with the same transmission quality by increasing the electric power only by 1.6 dB (22.5−20.9=1.6 dB).

In the following, an explanation is given of a configuration of a multilevel modulation device according to the above-described embodiment. The multilevel modulation device according to this embodiment has the same configuration as that in the first embodiment shown in FIG. 1, for example. The multilevel modulation device according to this embodiment may have the following configuration. A first data converting circuit 3 inputs therein a signal of n×p+q bits (n is a predetermined integer, p is an integer equal to or more than 2, and q is a positive integer smaller than n), and outputs a signal of p+1 bits. A second data converting circuit 4 inputs therein the signal of n×p+q bits and the signal of p+1 bits, and outputs n pieces of signals (converted data) each having p+1 bits in parallel. A parallel/serial converting circuit 5 inputs therein the n pieces of signals, and supplies a signal of p+1 bits to a multilevel modulator 6.

Namely, the multilevel modulation device according to this embodiment comprises the converting circuits (e.g., the circuits (terminal) 1, 2, 3 and 4 shown in FIG. 1) to input therein an input signal that can stand at different values from 1 to the maximum (n×p+q)-th power of 2, namely, $2^{(n \times p+q)}$ (p is an integer equal to or more than 2, q is a positive integer smaller than n), and to generate and output the first to n-th converted data according to the input signal. The multilevel modulation device further comprises the circuits (e.g., the circuits (modulator) 5 and 6 shown in FIG. 1) to input therein the first to n-th converted data and to execute the multilevel modulation thereto to output the multiplexed signal. The converting circuit (e.g., the circuit 3 shown in FIG. 1) classifies the input signal into any one of the predetermined first to m-th groups (m is an integer equal to or more than 2), which have disparate parameters, according to the value indicated by the input signal. Incidentally, the input signal may be a digital code indicating 1 through $2^{(n \times p+q)}$, or a digital code with an offset(s). That is, the input signal may be preferably a signal that can indicate one of the different values from 1 through $2^{(n \times p+q)}$.

It is assumed that the signal points used in the first phase plane are set to M. The signal points M are divided into m parts (groups), and there is realized the relationship in which the total of the divided integers, $M_{11}$, $M_{12}$, $M_{13}$, ... $M_{1m}$ is equal to M, that is, this expression $M = M_{11} + M_{12} + M_{13} + \ldots + M_{1m}$ is satisfied. The signal points M are allocated to an $M_{11}$ part, $M_{12}$ part, $M_{13}$ part, ... $M_{1m}$ part so as not to overlap to each other. Moreover, it is assumed that i is set to 2, 3, 4, ... n. An i-th phase plane is provided with (n−1) pieces of signal points of $M_{ij}$ (i=2, 3, ... n, and j=1, 2, 3, ... m) corresponding to each of the divided signal points $M_{11}$, $M_{12}$, $M_{13}$, ..., $M_{1m}$ in the first phase plane, respectively. $M_{ij}$ (i=1 to n, j=1 to m) is an integer equal to or smaller than M. Incidentally, M may be an integer other than that of 2 raised to the power of a positive integer, and is allowed to be set to an integer over and approximately equal to $2^{(p+q/n)}$. In addition, the total N obtained by adding up the products of the numbers of $M_{ij}$ (i=1 through n) $M_{1j} \times M_{2j} \times M_{3j} \times \ldots M_{nj}$ where j=1 through m is equal to or more than $2^{(np+q)}$). That is, the following expression is satisfied.

$$N = M_{11} \times M_{21} \times M_{31} \times \cdots \times M_{n1} +$$
$$M_{12} \times M_{22} \times M_{32} \times \cdots \times M_{n2} +$$
$$M_{13} \times M_{23} \times M_{33} \times \cdots \times M_{n3} + \cdots +$$
$$M_{1m} \times M_{2m} \times M_{3m} \times \cdots \times M_{nm}$$
$$= 2^{(np+q)} \text{ (or } N > 2^{(np+q)})$$

For example, when in the first data converting circuit 3 shown in FIG. 1 the input signal belongs to the first group, the first converted data stands at one of the values from 1 to $M_{11}$ according to the value of the input signal. In this case, the second data converting circuit 4 shown in FIG. 1 outputs the first converted data that stands at one of values from 1 to $M_{11}$ and the second to n-th converted data that stand at one of the different values of $M_{21}$, ..., $M_{n1}$, respectively, which are assigned according to the value of the input signal. When the input signal belongs to the first group, there are obtained $M_{11} \times M_{21} \times M_{31} \times \ldots \times M_{n1}$ combinations with the first to n-th data.

When in the first data converting circuit 3 the input signal belongs to the second group, the first converted data stands at one of the values from $1+M_{11}$ to $M_{11}+M_{12}$ according to the value of the input signal. In this case, the second data converting circuit 4 outputs the first converted data and the second to n-th converted data that stand at one of the different values of $M_{22}$, ..., $M_{n2}$, respectively, which are assigned according to the value of the input signal. When the input signal belongs to the second group, there are obtained $M_{12} \times M_{22} \times M_{32} \times \ldots \times M_{n2}$ combinations with the first to n-th data.

When in the first data converting circuit 3 the input signal belongs to the third group, the first converted data stands at one of the values from $1+M_{11}+M_{12}$ to $M_{11}+M_{12}+M_{13}$ according to the value of the input signal. In this case, the second data converting circuit 4 outputs the first converted data and the second to n-th converted data that stand at one of the different values of $M_{23}$, ..., $M_{n3}$, respectively, which are assigned according to the value of the input signal. When the input signal belongs to the third group, there are obtained $M_{13} \times M_{23} \times M_{33} \times \ldots \times M_{n3}$ combinations with the first to n-th data.

When in the first data converting circuit 3 the input signal belongs to the m-th group, the first converted data stands at one of the values from $1+M_{11}+M_{12}+\ldots+M_{1m-1}$ to $M_{11}+M_{12}+\ldots+M_{1m}$ according to the value of the input signal. In this case, the second data converting circuit 4 outputs the first converted data and the second to n-th converted data that stand at one of the different values of $M_{2m}$, ..., $M_{nm}$, respectively, which are assigned according to the value of the input signal.

The first to n-th converted data generated and outputted through the first and second data converting circuits 3 and 4 are time-division multiplexed, for example, in the parallel/serial converting circuit 5 shown in FIG. 1. The multiplexed data is fed into the multilevel modulator 6, and multilevel modulation is executed thereto. The data conversion in the first and second data converting circuits 3 and 4 are executed, for example, with reference to a conversion table (look-up table) stored in a ROM (not shown). Incidentally in this embodiment, the first and second data converting circuits 3 and 4 may be configured as one converting circuit.

Moreover, a multilevel demodulation device according to this embodiment has the basic configuration as shown in FIG. 2. The signal demodulated in the multilevel demodulator 12, which receives communication signals, is demultiplexed in the serial/parallel converting circuit 13 to output n pieces of demodulated data of p+1 bits, which are fed into the data inverse conversion circuit 14. When the first demodulated data stands at one of the values from 1 to $M_{11}$, the conversion circuit 14 receives the second to n-th demodulated data that stand at one of the different values of $M_{21}, \ldots, M_{n1}$, respectively. When the first demodulated data stands at one of the values from $1+M_{11}$ to $M_{11}+M_{12}$, the conversion circuit 14 receives the second to n-th demodulated data that stand at one of the different values of $M_{22}, \ldots, M_{n2}$, respectively. When the first demodulated data stands at one of the values from $1+M_{11}+M_{12}$ to $M_{11}+M_{12}+M_{13}$, the conversion circuit 14 receives the second to n-th demodulated data that stand at one of the different values of $M_{23}, \ldots, M_{n3}$, respectively. When the first demodulated data stands at one of the values from $1+M_{11}+M_{12}+\ldots+M_{1m-1}$ to $M_{11}+M_{12}+\ldots+M_{1m}$, the conversion circuit 14 receives the second to n-th demodulated data that stand at one of the different value of $M_{2m}, \ldots, M_{nm}$, respectively. The conversion circuit 14 generates predetermined demodulated data values selected from among 1 to $2^{(n \times p+q)}$ according to the values indicated by the first to n-th demodulated data signals, respectively, and outputs a demodulated data signal of, for example, (n×p+q) bits.

FIG. 13 is a diagram showing parameters used to realize various multilevel modulation systems. When p=3 to 5, n=4 and q=1, 10QAM, 20QAM, and 40QAM are realized, respectively:

n=3 and q=1, 11QAM, 22QAM, and 44QAM are realized, respectively:

n=2 and q=1, 12QAM, 24QAM, and 48QAM are realized, respectively:

n=3 and q=2, 14QAM, 28QAM, and 56QAM are realized, respectively: and n=4 and q=3, 15QAM, 30QAM, and 60QAM are realized, respectively.

While the present invention has been explained with the above embodiments, the present invention is not limited to the above configurations, and includes the modified and amended configurations that can be obtained by those skilled in the art within the scope of the claims of the present invention. For example, p in FIG. 13 may be an arbitrary natural number larger than 5, and accordingly, other multilevel modulation systems can be established.

As set forth hereinbefore, according to the present invention, an input data of 4p+1 bits is assigned to four modulation symbols, and binary data of p+0.25 bits is transmitted with one modulation symbol sequence obtained by multiplexing the four modulation symbols on time-axis, thus enabling a number of multilevel in the QAM system to be set to approximate $2^{(p+0.25)}$. Thereby, it becomes possible to provide a multilevel transmission system of an intermediate number of multilevel, which is applicable to a case where, when employing $2^n$QAM, unused portion of a frequency band is large, however, when employing $2^{(n-1)}$QAM, the frequency band is not enough to meet a requirement. Consequently, it becomes possible to effectively utilize the frequency band and to realize $2^{(n-0.75)}$QAM with a required S/N ratio lower than that of $2^n$QAM, thus also enabling effective utilization of electric power. Further, according to the present invention, the configuration method is disclosed in general form, which is available when p is a predetermined integer equal to or more than 3. Thereby, the present invention can be applied to various QAM modulation systems, for example, 10QAM, 20QAM, 40QAM, 80QAM, 160QAM, and the like.

Moreover, while in the prior art the $2^n$QAM such as 4QAM, 16QAM, 32QAM, 64QAM 128QAM, 256QAM, etc. is employed in which n is set to an arbitrary positive integer, it becomes possible to set the number of multilevel to (approximate) $2^{(p+q/n)}$ (p and n are positive integers equal to or more than 2, and q is a positive integer smaller than n) according to the present invention.

Furthermore, according to the present invention, it becomes possible to provide a multilevel transmission system with an intermediate number of multilevel, which is applicable to a case where, when employing $2^p$QAM (p is a predetermined positive integer), unused portion of a frequency band is large, however, when employing $2^{(p-1)}$ QAM, the frequency band is not enough to meet a requirement. Consequently, it becomes possible to effectively utilize the frequency band and to realize $2^{(p-\alpha)}$QAM (0<α<1) with a required S/N ratio lower than that of $2^p$QAM, thus also enabling effective utilization of electric power.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A modulation device for modulating an input data string to output a communication signal, comprising:
    a data string number converting circuit for converting the input data string into an input data signal of a binary signal of 4p+1 bits (p is an integer equal to or more than 3);
    a first data converting circuit for inputting and converting the input data signal;
    a second data converting circuit for inputting the input data signal and an output signal from the first data converting circuit to convert into four signals each having p+1 bits;
    a parallel/serial converting circuit for time-division multiplexing the four signals of p+1 bits outputted from the second data converting circuit; and
    a modulator for modulating an output signal from the parallel/serial converting circuit to output a communication signal, wherein:
    the first data converting circuit outputs an output signal standing at one of values from 1 to $(5/4) \times 2^p$ according to a value of the input data signal; and
    in response to the output signal from the first data converting circuit and based on the input data signal,
        when the output signal from the first data converting circuit stands at one of values from 1 to $4 \times 2^{(p-3)}$, the second data converting circuit outputs the output signal from the first data converting circuit as a first output signal, and outputs second, third and fourth output signals that stand at predetermined one of $(5/4) \times 2^p$ different values, respectively;
        when the output signal from the first data converting circuit stands at one of values from $1+4 \times 2^{(p-3)}$ to $4 \times 2^{(p-3)}+3 \times 2^{(p-3)}$, the second data converting circuit outputs the output signal from the first data converting circuit as a first output signal, and outputs second, third and fourth output signals that stand at predetermined one of $(5/4) \times 2^p$ different values, one of $(5/4) \times 2^p$ different values, and one of $2^p$ different values, respectively;

when the output signal from the first data converting circuit stands at one of values from $1+4 \times 2^{(p-3)}+3 \times 2^{(p-3)}$ to $4 \times 2^{(p-3)}+3 \times 2^{(p-3)}+2 \times 2^{(p-3)}$, the second data converting circuit outputs the output signal from the first data converting circuit as a first output signal, and outputs second, third and fourth output signals that stand at predetermined one of $(5/4) \times 2^p$ different values, one of $2^p$ different values, and one of $2^p$ different values, respectively; or when the output signal from the first data converting circuit stands at one of values from $1+4 \times 2^{(p-3)}+3 \times 2^{(p-3)}+2 \times 2^{(p-3)}$ to $4 \times 2^{(p-3)}+3 \times 2^{(p-3)}+2 \times 2^{(p-3)}+2^{(p-3)}$, the second data converting circuit outputs the output signal from the first data converting circuit as a first output signal, and outputs second, third and fourth output signals that stand at predetermined one of $2^p$ different values, respectively.

2. The modulation device as claimed in claim 1, further including
a modulation control means for controlling the first and second converting circuits, wherein
the modulation control means can change correspondence between the input data signal and an output value in the first and second data converting circuits, respectively.

3. A modulation device comprising:
a conversion means for inputting an input signal that stands at one of values from 1 to 2 raised to the power of $(4p+1)$, namely, one of values from 1 to $2^{(4p+1)}$ (p is an integer equal to or more than 3) to generate and output first to fourth converted data based on the input signal; and
a means for inputting the first to fourth converted data to modulate the converted data, and outputting the modulated data, wherein:
the conversion means includes:
a means for determining, according to a value of the input signal, which group among predetermined four groups that have disparate parameters the input signal belongs to; and
a means for:
converting, when the input signal belongs to a first group, the first converted data into data that stands at one of values from 1 to $4 \times 2^{(p-3)}$ according to the value of the input signal, and the second, third and fourth converted data into data that stand at one of values from 1 to $(5/4) \times 2^p$, respectively, that is assigned according to the value of the input signal so as to obtain $5_3 \times 2^{(4p-7)}$ different combinations with the first to fourth converted data for the input signal that belongs to the first group, and outputting the converted data;
converting, when the input signal belongs to a second group, the first converted data into data that stands at one of values from $1+4 \times 2^{(p-3)}$ to $4 \times 2^{(p-3)}+3 \times 2^{(p-3)}$ according to the value of the input signal, and the second, third and fourth converted data into data that stand at one of values from 1 to $(5/4) \times 2^p$, one of values from 1 to $(5/4) \times 2^p$, and one of values from 1 to $2^p$, respectively, that are assigned according to the value of the input signal so as to obtain $3 \times 5^2 \times 2^{(4p-7)}$ different combinations with the first to fourth converted data for the input signal that belongs to the second group, and outputting the converted data;

converting, when the input signal belongs to a third group, the first converted data into data that stands at one of values from $1+4 \times 2^{(p-3)}+3 \times 2^{(p-3)}$ to $4 \times 2^{(p-3)}+3 \times 2^{(p-3)}+2 \times 2^{(p-3)}$ according to the value of the input signal, and the second, third and fourth converted data into data that stand at one of values from 1 to $(5/4) \times 2^p$, one of values from 1 to $2^p$, and one of values from 1 to $2^p$, respectively, that are assigned according to the value of the input signal so as to obtain $5 \times 2_{(4p-4)}$ different combinations with the first to fourth converted data for the input signal that belongs to the third group, and outputting the converted data; or
converting, when the input signal belongs to a fourth group, the first converted data into data that stands at one of values from $1+4 \times 2^{(p-3)}+3 \times 2^{(p-3)}+2 \times 2^{(p-)}$ to $4 \times 2^{(p-3)}+3 \times 2^{(p-3)}+2 \times 2^{(p-3)}+2^{(p-3)}$ according to the value of the input signal, and the second, third and fourth converted data into data that stand at one of values from 1 to $2^p$, respectively, that is assigned according to the value of the input signal so as to obtain $2^{(4p-3)}$ different combinations with the first to fourth converted data for the input signal that belongs to the fourth group, and outputting the converted data.

4. A modulation device comprising:
a conversion means for inputting an input signal that stands at one of values from 1 to 2 raised to the power of $(n \times p+q)$, namely, one of values from 1 to $2^{(n \times p+q)}$ (p is an integer equal to or more than 2, n is a predetermined positive integer, and q is a positive integer smaller than n) to generate and output first to n-th converted data based on the input signal; and
a means for inputting the first to n-th converted data to modulate the converted data, and outputting the modulated data, wherein:
the conversion means includes:
a means for determining, according to a value of the input signal, which group among predetermined first to m-th groups (m is a predetermined integer equal to or more than 2) that have disparate parameters the input signal belongs to, wherein:
signal points of a first phase plane for the first converted data are set to M, M is divided into m parts of $M_{11}, M_{12}, \ldots, M_{1m}$ and a sum of each divided integer $M_{11}, M_{12}, \ldots, M_{1m}$ is equal to M, namely, the expression $$M = M_{11} + M_{12} + \ldots + M_{1m}$$

is satisfied;
the signal points of the first phase plane is divided into m parts each including signal points of $M_{11}, M_{12}, \ldots, M_{1m}$;
(n−1) pieces of $M_{ij}$ (i is set to an integer from 2 to n, and j is set to an integer from 1 to m) are assigned as signal points in an i-th phase plane corresponding to the divided $M_{11}, M_{12}, \ldots, M_{1m}$ in the first phase plane, respectively;
each $M_{ij}$ is set to an integer smaller than M (i is set to an integer from 1 to n, and j is set to an integer from 1 to m); and
a sum of respective products of signal points $M_{ij}$ where i is from 1 to n $$M_{1j} \times M_{2j} \times \ldots \times M_{nj}$$

when j is from 1 to m in the expression is set to equal to or over $2^{(np+q)}$; and a means for:
- converting, when the input signal belongs to a first group, the first converted data into data that stands at one of values from 1 to $M_{11}$ according to the value of the input data, and the second to n-th converted data into data that stand at one of different values of $M_{21}$ through one of different values of $M_{n1}$, respectively, that are assigned according to the value of the input data; or
- converting, when the input signal belongs to a j-th group (j is an integer larger than 1, and smaller than or equal to m), the first converted data into data that stands at one of values from a value which is obtained by adding 1 to a sum of signal points $M_{11}$ through $M_{1j-1}$ to a sum from $M_{11}$ through $M_{1j}$ according to the value of the input data, and the second to n-th converted data into data that stand at one of different values of $M_{2j}$ through one of different values of $M_{nj}$, respectively, that are assigned according to the value of the input data.

5. The modulation device as claimed in claim 4, wherein the M is allowed to be set to an integer other than 2 raised to the power of a positive integer, and an integer over $2^{(p+q/n)}$.

6. The modulation device as claimed in claim 4, wherein:
the M is allowed to be set to an integer other than 2 raised to the power of a positive integer, and an integer over $2^{(p+q/n)}$; and
the M is an integer smaller than $2^{(p+1)}$.

7. A demodulation device for demodulating a communication signal to output a demodulated data signal of 4p+1 bits (p is an integer equal to or more than 3), comprising:
a demodulator for demodulating the communication signal to output a received and demodulated data string signal;
a serial/parallel converting circuit for time-division demultiplexing the received and demodulated data string signal to output first, second, third and fourth demodulated data string signals; and
a data inverse conversion circuit for inputting therein the first to fourth demodulated data string signals to output the demodulated data signal of 4p+1 bits, wherein:
the data inverse conversion circuit generates predetermined demodulated data values based on values indicated by the first, second, third and fourth demodulated data string signals in response to:
the second, third and fourth demodulated data string signals that stand at predetermined one of $(5/4) \times 2^p$ different values, respectively, when the first demodulated data string signal stands at one of values from 1 to $4 \times 2^{(p-3)}$;
the second, third and fourth demodulated data string signals that stand at predetermined one of $(5/4) \times 2^p$ different values, one of $(5/4) \times 2^p$ different values, and one of $2^p$ different values, respectively, when the first demodulated data string signal stands at one of values from $1+4 \times 2^{(p-3)}$ to $4 \times 2^{(p-3)}+3 \times 2^{(p-3)}$;
the second, third and fourth demodulated data string signals that stand at predetermined one of $(5/4) \times 2^p$ different values, one of $2^p$ different values, and one of $2^p$ different values, respectively, when the first demodulated data string signal stands at one of values from $1+4 \times 2^{(p-3)}+3 \times 2^{(p-3)}$ to $4 \times 2^{(p-3)}+3 \times 2^{(p-3)}+2 \times 2^{(p-3)}$; or
the second, third and fourth demodulated data string signals that stand at predetermined one of $2^p$ different values, respectively, when the first demodulated data string signal stands at one of values from $1+4 \times 2^{(p-3)}+3 \times 2^{(p-3)}+2 \times 2^{(p-3)}$ to $4 \times 2^{(p-3)}+3 \times 2^{(p-3)}+2 \times 2^{(p-3)}+2^{(p-3)}$; and outputs the demodulated data values as the demodulated data signal of 4p+1 bits.

8. The demodulation device as claimed in claim 7, further including
a demodulation control means for controlling the data inverse conversion circuit, wherein
the demodulation control means can change correspondence between the first, second, third and fourth demodulated data string signals inputted into the data inverse conversion circuit and an output value therefrom.

9. A demodulation device for receiving a signal modulated at the modulation device claimed in any one of claim 4, 5 or 6 comprising:
a demodulator for receiving and demodulating the signal;
a means for receiving a signal demodulated at the demodulator to output first to n-th demodulated data (n is an integer equal to or more than 2); and
a data inverse conversion means for outputting a data signal that stands at one of values from 1 to 2 raised to the power of (n×p+q) based on values indicated by the first to n-th demodulated data in response to:
the second to n-th demodulated data that stand at one of different values of $M_{21}$ through one of different values of $M_{n1}$, respectively, when the first demodulated data stands at one of values from 1 to $M_{11}$; or
the second to n-th demodulated data that stand at one of different values of $M_{2j}$ through one of different values of $M_{nj}$, respectively, when the first demodulated data stands at one of values from a value where a sum from $M_{11}$ through $M_{1j-1}$ (j is an integer larger than 1, and smaller than or equal to m) is added by 1 to a value where $M_{11}$ through $M_{1j}$ are added.

10. A modulation and demodulation communication system comprising: a modulation device for modulating an input data string to output a communication signal, comprising:
a data string number converting circuit for converting the input data string into an input data signal of a binary signal of 4p+1 bits (p is an integer equal to or more than 3);
a first data converting circuit for inputting and converting the input data signal;
a second data converting circuit for inputting the input data signal and an output signal from the first data converting circuit to convert into four signals each having p+1 bits;
a parallel/serial converting circuit for time-division multiplexing the four signals of p+1 bits outputted from the second data converting circuit; and
a modulator for modulating an output signal from the parallel/serial converting circuit to output a communication signal, wherein:
the first data converting circuit outputs an output signal standing at one of values from 1 to $(5/4) \times 2^p$ according to a value of the input data signal; and
in response to the output signal from the first data converting circuit and based on the input data signal,
when the output signal from the first data converting circuit stands at one of values from 1 to $4 \times 2^{(p-3)}$, the second data converting circuit outputs the output signal from the first data converting circuit as a first output signal, and outputs second, third and fourth output signals that stand at predetermined one of $(5/4)\times 2^p$ different values, respectively;

when the output signal from the first data converting circuit stands at one of values from $1+4\times 2^{(p-3)}$ to $4\times 2^{(p-3)}+3\times 2^{(p-3)}$, the second data converting circuit outputs the output signal from the first data converting circuit as a first output signal, and outputs second, third and fourth output signals that stand at predetermined one of $(5/4)\times 2^p$ different values, one of $(5/4)\times 2^p$ different values, and one of $2^p$ different values, respectively;

when the output signal from the first data converting circuit stands at one of values from $1+4\times 2^{(p-3)}+3\times 2^{(p-3)}$ to $4\times 2^{(p-3)}+3\times 2^{(p-3)}+2\times 2^{(p-3)}$, the second data converting circuit outputs the output signal from the first data converting circuit as a first output signal, and outputs second, third and fourth output signals that stand at predetermined one of $(5/4)\times 2^p$ different values, one of $2^p$ different values, and one of $2^p$ different values, respectively; or when the output signal from the first data converting circuit stands at one of values from $1+4\times 2^{(p-3)}+3\times 2^{(p-3)}+2\times 2^{(p-3)}$ to $4\times 2^{(p-3)}+3\times 2^{(p-3)}+2\times 2^{(p-3)}+2^{(p-3)}$, the second data converting circuit outputs the output signal from the first data converting circuit as a first output signal, and outputs second, third and fourth output signals that stand at predetermined one of $2^p$ different values, respectively; and a demodulation device for demodulating a communication signal to output a demodulated data signal of 4p+1 bits (p is an integer equal to or more than 3), comprising:

a demodulator for demodulating the communication signal to output a received and demodulated data string signal;

a serial/parallel converting circuit for time-division demultiplexing the received and demodulated data string signal to output first, second, third and fourth demodulated data string signals; and a data inverse conversion circuit for inputting therein the first to fourth demodulated data string signals to output the demodulated data signal of 4p+1 bits, wherein:

the data inverse conversion circuit generates predetermined demodulated data values based on values indicated by the first, second, third and fourth demodulated data string signals in response to:

the second, third and fourth demodulated data string signals that stand at predetermined one of $(5/4)\times 2^p$ different values, respectively, when the first demodulated data string signal stands at one of values from 1 to $4\times 2^{(p-3)}$;

the second, third and fourth demodulated data string signals that stand at predetermined one of $(5/4)\times 2^p$ different values, one of $(5/4)\times 2^p$ different values, and one of $2^p$ different values, respectively, when the first demodulated data string signal stands at one of values from $1+4\times 2^{(p-3)}$ to $4\times 2^{(p-3)}+3\times 2^{(p-3)}$;

the second, third and fourth demodulated data string signals that stand at predetermined one of $(5/4)\times 2^p$ different values, one of $2^p$ different values, and one of $2^p$ different values, respectively, when the first demodulated data string signal stands at one of values from $1+4\times 2^{(p-3)}+3\times 2^{(p-3)}$ to $4\times 2^{(p-3)}+3\times 2^{(p-3)}+2\times 2^{(p-3)}$; or the second, third and fourth demodulated data string signals that stand at predetermined one of $2^p$ different values, respectively, when the first demodulated data string signal stands at one of values from $1+4\times 2^{(p-3)}+3\times 2^{(p-3)}\times 2\times 2^{(p-3)}$ to $4\times 2^{(p-3)}+3\times 2^{(p-3)}+2\times 2^{(p-3)}+2^{(p-3)}$; and outputs the demodulated data values as the demodulated data signal of 4p+1 bits.

11. A modulation and demodulation communication system comprising: a modulation device for modulating an input data string to output a communication signal, comprising:

a data string number converting circuit for converting the input data string into an input data signal of a binary signal of 4p+1 bits (p is an integer equal to or more than 3);

a first data converting circuit for inputting and converting the input data signal;

a second data converting circuit for inputting the input data signal and an output signal from the first data converting circuit to convert into four signals each having p+1 bits;

a parallel/serial converting circuit for time-division multiplexing the four signals of p+1 bits outputted from the second data converting circuit; and a modulator for modulating an output signal from the parallel/serial converting circuit to output a communication signal, wherein:

the first data converting circuit outputs an output signal standing at one of values from 1 to $(5/4)\times 2^p$ according to a value of the input data signal; and in response to the output signal from the first data converting circuit and based on the input data signal, when the output signal from the first data converting circuit stands at one of values from 1 to $4\times 2^{(p-3)}$, the second data converting circuit outputs the output signal from the first data converting circuit as a first output signal, and outputs second, third and fourth output signals that stand at predetermined one of $(5/4)\times 2^p$ different values, respectively;

when the output signal from the first data converting circuit stands at one of values from $1+4\times 2^{(p-3)}$ to $4\times 2^{(p-3)}+3\times 2^{(p-3)}$, the second data converting circuit outputs the output signal from the first data converting circuit as a first output signal, and outputs second, third and fourth output signals that stand at predetermined one of $(5/4)\times 2^p$ different values, one of $(5/4)\times 2^p$ different values, and one of $2^p$ different values, respectively;

when the output signal from the first data converting circuit stands at one of values from $1+4\times 2^{(p-3)}+3\times 2^{(p-3)}$ to $4\times 2^{(p-3)}+3\times 2^{(p-3)}+2\times 2^{(p-3)}$, the second data converting circuit outputs the output signal from the first data converting circuit as a first output signal, and outputs second, third and fourth output signals that stand at predetermined one of $(5/4)\times 2^p$ different values, one of $2^p$ different values, and one of $2^p$ different values, respectively; or when the output signal from the first data converting circuit stands at one of values from $1+4\times 2^{(p-3)}+3\times 2^{(p-3)}+2\times 2^{(p-3)}$ to $4\times 2^{(p-3)}+3\times 2^{(p-3)}+2\times 2^{(p-3)}+2^{(p-3)}$, the second data converting circuit outputs the output signal from the first data converting circuit as a first output signal, and outputs second, third and fourth output signals that stand at predetermined one of $2^p$ different values, respectively, the modulation device further including a modulation control means for controlling the first and second converting circuits, wherein the modulation control means can change correspondence between the input data signal and an output value in the first and second data converting circuits, respectively; and a demodulation device for demodulating a communication signal to output a demodulated data signal of 4p+1 bits (p is an integer equal to or more than 3), comprising:

a demodulator for demodulating the communication signal to output a received and demodulated data string signal;

a serial/parallel converting circuit for time-division demultiplexing the received and demodulated data string signal to output first, second, third and fourth demodulated data string signals; and a data inverse conversion circuit for inputting therein the first to fourth demodulated data string signals to output the demodulated data signal of 4p+1 bits, wherein:

the data inverse conversion circuit generates predetermined demodulated data values based on values indicated by the first, second, third and fourth demodulated data string signals in response to:

the second, third and fourth demodulated data string signals that stand at predetermined one of $(5/4) \times 2^p$ different values, respectively, when the first demodulated data string signal stands at one of values from 1 to $4 \times 2^{(p-3)}$;

the second, third and fourth demodulated data string signals that stand at predetermined one of $(5/4) \times 2^p$ different values, one of $(5/4) \times 2^p$ different values, and one of $2^p$ different values, respectively, when the first demodulated data string signal stands at one of values from $1+4 \times 2^{(p-3)}$ to $4 \times 2^{(p-3)}+3 \times 2^{(p-3)}$;

the second, third and fourth demodulated data string signals that stand at predetermined one of $(5/4) \times 2^p$ different values, one of $2^p$ different values, and one of $2^p$ different values, respectively, when the first demodulated data string signal stands at one of values from $1+4 \times 2^{(p-3)}+3 \times 2^{(p-3)}$ to $4 \times 2^{(p-3)}+3 \times 2^{(p-)}+2 \times 2^{(p-3)}$; or the second, third and fourth demodulated data string signals that stand at predetermined one of $2^p$ different values, respectively, when the first demodulated data string signal stands at one of values from $1+4 \times 2^{(p-3)}+3 \times 2^{(p-3)}+2 \times 2^{(p-3)}$ to $4 \times 2^{(p-3)}+3 \times 2^{(p-3)}+2 \times 2^{(p-3)}+2^{(p-3)}$; and outputs the demodulated data values as the demodulated data signal of 4p+1 bits, the demodulating device further including a demodulation control means for controlling the data inverse conversion circuit, wherein the demodulation control means can change correspondence between the first, second, third and fourth demodulated data string signals inputted into the data inverse conversion circuit and an output value therefrom.

12. A computer readable medium storing executable modulation program instructions for modulating an input data signal of 4p+1 bits (p is an integer equal to or more than 3), which, when executed by a processor, cause the processor executing the processes of:

converting the input data signal into first, second, third and fourth converted data;

setting a value indicated by the first converted data to one of values from 1 to $(5/4) \times 2^p$ according to a value of the input data signal; and when the first converted data stands at one of values from 1 to $4 \times 2^{(p-3)}$, setting values indicated by the second, third and fourth converted data to predetermined one of $(5/4) \times 2^p$ different values, respectively, according to the value of the input data signal;

when the first converted data stands at one of values from $1+4 \times 2^{(p-3)}$ to $4 \times 2^{(p-3)}+3 \times 2^{(p-3)}$, setting values indicated by the second, third and fourth converted data to predetermined one of $(5/4) \times 2^p$ different values, one of $(5/4) \times 2^p$ different values, and one of $2^p$ different values, respectively, according to the value of the input data signal;

when the first converted data stands at one of values from $1+4 \times 2^{(p-3)}+3 \times 2^{(p-3)}$ to $4 \times 2^{(p-3)}+3 \times 2^{(p-3)}+2 \times 2^{(p-3)}$, setting values indicated by the second, third and fourth converted data to predetermined one of $(5/4) \times 2^p$ different values, one of $2^p$ different values, and one of $2^p$ different values, respectively, according to the value of the input data signal; or when the first converted data stands at one of values from $1+4 \times 2^{(p-3)}+3 \times 2^{(p-3)}+2 \times 2^{(p-3)}$ to $4 \times 2^{(p-3)}+3 \times 2^{(p-3)}+2 \times 2^{(p-3)}+2^{(p-3)}$, setting values indicated by the second, third and fourth converted data to predetermined one of $2^p$ different values, respectively, according to the value of the input data signal; and outputting the first, second, third and fourth converted data toward a modulator sequentially.

13. A computer readable medium storing executable modulation program instructions to get a computer that configured a modulation device to execute a process of modulating an input signal that stands at one of values from 1 to $2^{(n \times p+q)}$ (p is an integer equal to or more than 2, n is a predetermined positive integer, and q is a positive integer smaller than n) to output the modulated input signal, the modulation program executing:

a converting process of inputting the input signal to generate and output first to n-th converted data based on a value of the input signal; and a process of inputting the first to n-th converted data to multiplex-modulate and output the data, wherein:

the converting process further includes:

a process of classifying the input signal into one of m groups that have disparate parameters according to the value of the input signal, wherein:

signal points in a first phase plane are set to M, M is divided into m parts of $M_{11}, M_{12}, \ldots, M_{1m}$, and a sum of each divided integer $M_{11}, M_{12}, \ldots, M_{1m}$ is equal to M, namely, the expression $$M = M_{11} + M_{12} + \ldots + M_{1m}$$

is satisfied;

the signal points of the first phase plane is divided into m parts each including signal points of $M_{11}, M_{12}, \ldots, M_{1m}$;

(n−1) pieces of $M_{ij}$ (i is set to an integer from 2 to n, and j is set to an integer from 1 to m) are assigned as signal points in an i-th phase plane corresponding to the divided $M_{11}, M_{12}, M_{1m}$ in the first phase plane, respectively;

each $M_{ij}$ is set to an integer smaller than M (i is set to an integer from 1 to n, and j is set to an integer from 1 to m); and a sum of respective products of signal points $M_{ij}$ where i is from 1 to n $$M_{1j} \times M_{2j} \times \ldots \times M_{nj}$$

when j is from 1 to m in the expression is set to equal to or over $2^{(np+q)}$; and a process of converting, when the input signal belongs to the first group, the first input converted data into data that stands at one of values from 1 to $M_{11}$ according to the value of the input data, and the second to n-th converted data into data that stand at one of different values of $M_{21}$ through one of different values of $M_{n1}$, respectively, that are assigned according to the value of the input data; or a process of converting, when the input signal belongs to a j-th group (j is an integer larger than 1, and smaller than or equal to m), the first converted data into data that stands at one of values from a value which is obtained by adding 1 to a sum of signal points $M_{nj}$, through $M_{1j-1}$ to a sum from $M_{11}$ through $M_{1j}$ according to the value of the input data, and the second to n-th converted data into data that stand at one of different values of $M_{2j}$ through one of different values of $M_{nj}$, respectively, that are assigned according to the value of the input data.

14. The computer readable medium as claimed in claim 13, wherein the M is allowed to be set to an integer other than 2 raised to the power of a positive integer, and an integer over $2^{(p+q/n)}$.

15. The computer readable medium as claimed in claim 13, wherein:
the M is allowed to be set to an integer other than 2 raised to the power of a positive integer, and an integer over $2^{(p+q/n)}$; and
the M is an integer smaller than $2^{(p+1)}$.

16. A computer readable medium storing executable demodulation program instructions for demodulating a communication signal to output a demodulated data signal of 4p+1 bits (p is an integer equal to or more than 3), which, when executed by a processor, cause the processor executing the processes of:
inputting the communication signal as first, second, third and fourth demodulated data string signals to convert the demodulated data string signals into the demodulated data signal of 4p+1 bits;
generating predetermined demodulated data values based on values indicated by the first, second, third and fourth demodulated data string signals in response to the first demodulated data string signal that stands at one of $(5/4) \times 2^p$ different values; and
generating predetermined demodulated data values based on values indicated by the first, second, third and fourth demodulated data string signals in response to:
the second, third and fourth demodulated data string signals that stand at predetermined one of $(5/4) \times 2^p$ different values, respectively, when the first demodulated data string signal takes one of values from 1 to $4 \times 2^{(p-3)}$;
the second, third and fourth demodulated data string signals that stand at predetermined one of $(5/4) \times 2^p$ different values, one of $(5/4) \times 2^p$ different values, and one of $2^p$ different values, respectively, when the first demodulated data string signal takes one of values from $1++4 \times 2^{(p-3)}$ to $4 \times 2^{(p-3)}+3 \times 2^{(p-3)}$;
the second, third and fourth demodulated data string signals that stand at predetermined one of $(5/4) \times 2^p$ different values, one of $2^p$ different values, and one of $2^p$ different values, respectively, when the first demodulated data string signal takes one of values from $1+4 \times 2^{(p-3)}+3 \times 2^{(p-3)}$ to $4 \times 2^{(p-3)}+3 \times 2^{(p-3)}+2 \times 2^{(p-3)}$; or
the second, third and fourth demodulated data string signals that stand at predetermined one of $2^p$ different values, respectively, when the first demodulated data string signal takes one of values from $1+4 \times 2^{(p-3)}+3 \times 2^{(p-3)}+2 \times 2^{(p-3)}$ to $4 \times 2^{(p-3)}+3 \times 2^{(p-3)}+2 \times 2^{(p-3)}+2^{(p-3)}$;
and outputting the demodulated data values as the demodulated data signal of 4p+1 bits.

17. A computer readable medium storing executable demodulation program instructions to get a computer that configures a demodulation device receiving and demodulating a signal modulated at a modulation device that includes the computer executing the modulation program instructions recorded in a computer readable medium claimed in any one of claims 13 to 15 to execute
a process of outputting first to n-th demodulated data (n is an integer equal to or larger than 2) in response to the signal received and demodulated at a demodulator; and
an inverse conversion process of outputting a data signal that takes one of values from 1 to 2 raised to the power of (n×p+q) based on values indicated by the first to n-th demodulated data in response to:
the second to n-th demodulated data that stand at one of different values of $M_{21}$ through one of different values of $M_{n1}$, respectively, when the first demodulated data takes one of values from 1 to $M_{11}$; or
the second to n-th demodulated data that stand at one of different values of $M_{2j}$ through one of different values of $M_{nj}$, respectively, when the first demodulated data takes one of values from a value where a sum from $M_{11}$ through $M_{ij-1}$ (j is an integer larger than 1, and smaller than or equal to m) is added by 1 to a sum from $M_{11}$ through $M_{1j}$.

18. A modulation and demodulation method for assigning an input signal of 4p+1 bits (p is an integer equal to or more than 3) to four modulation symbols, comprising the steps of:
using predetermined one of $(5/4) \times 2^p$ signal points in a first modulation symbol; and
using predetermined one of $(5/4) \times 2^p$ signal points in second, third and fourth modulation symbols, respectively, according to the input signal when the first modulation symbol takes predetermined one of signal points from 1 to $4 \times 2^{(p-3)}$;
using predetermined one of $(5/4) \times 2^p$ signal points, one of $(5/4) \times 2^p$ signal points, and one of $2^p$ signal points in second, third and fourth modulation symbols, respectively, according to the input signal when the first modulation symbol takes predetermined one of signal points from $1+4 \times 2^{(p-3)}$ to $4 \times 2^{(p-3)}+3 \times 2^{(p-3)}$;
using predetermined one of $(5/4) \times 2^p$ signal points, one of $2^p$ signal points, and one of $2^p$ signal points in second, third and fourth modulation symbols, respectively, according to the input signal when the first modulation symbol takes predetermined one of signal points from $1+4 \times 2^{(p-3)}+3 \times 2^{(p-3)}$ to $4 \times 2^{(p-3)}+3 \times 2^{(p-3)}+2 \times 2^{(p-3)}$; or
using predetermined one of $2^p$ signal points in second, third and fourth modulation symbols, respectively, according to the input signal when the first modulation symbol takes predetermined one of signal points from $1+4 \times 2^{(p-3)}+3 \times 2^{(p-3)}+2 \times 2^{(p-3)}$ to $4 \times 2^{(p-3)}+3 \times 2^{(p-3)}+2 \times 2^{(p-3)}+2^{(p-3)}$.

19. A modulation method for executing modulation with a number of multilevel of $2^{(p+q/n)}$, comprising the steps of:
setting n to an integer equal to or more than 2, m to an integer equal to or more than 2, p to a predetermined positive integer, q to a positive integer smaller than n, M to an integer other than a value of 2 raised to the power of a predetermined positive integer and over 2 raised to the power of (p+q/n), namely, over $2^{(p+q/n)}$;

setting signal points in a first phase plane to M and dividing M into m parts of $M_{11}, M_{12}, \ldots, M_{1m}$ so that a sum of each divided integer of $M_{11}, M_{12}, \ldots, M_{1m}$ is equal to M, namely, so that the expression $$M = M_{11} + M_{12} + \ldots + M_{1m}$$

is satisfied;

dividing the signal points of the first phase plane into m parts each including signal points of $M_{11}, M_{12}, \ldots, M_{1m}$;

assigning (n−1) pieces of $M_{ij}$ (i is an integer from 2 to n, and j is an integer from 1 to m) as signal points in an i-th phase plane corresponding to the divided $M_{11}, M_{12}, \ldots M_{1m}$ in the first phase plane, respectively;

setting each $M_{ij}$ (i is an integer from 1 to n, and j is an integer from 1 to m) smaller than M;

setting a sum of respective products of signal points $M_{ij}$ where i is from 1 to n $$M_{1j} \times M_{2j} \times \ldots M_{nj}$$

when j is from 1 to m in the expression to a value equal to or over $2^{(np+q)}$; and assigning a binary signal of $2^{(np+q)}$ to n pieces of phase planes from the first phase plane to an n-th phase plane, and assigning (p+q/n) bits per modulation symbol.

20. The modulation method as claimed in claim 19, wherein the M is an integer smaller than $2^{(p+1)}$.

21. A modulation method comprising the steps of:

inputting an input signal that stands at one of values from 1 to 2 raised to the power of (n×p+q), namely, $2^{(n \times P + q)}$ (p is a predetermined integer equal to or more than 2, n is a predetermined positive integer, and q is a positive integer smaller than n), and generating and outputting first to n-th converted data based on the input signal; and inputting the first to n-th converted data to modulate the converted data, and outputting the modulated converted data; and when generating and outputting the first to n-th converted data, the modulation method further including the steps of:

determining, according to a value of the input signal, which group among predetermined first to m-th groups that have disparate parameters the input signal belongs to, wherein signal points of a first phase plane for the first converted data are set to M, M is divided into m parts of $M_{11}, M_{12}, \ldots, M_{1m}$, and a sum of each divided integer of $M_{11}, M_{12}, \ldots, M_{1m}$ is equal to M, namely, the expression $$M = M_{11} + M_{12} + \ldots + M_{1m}$$

is satisfied;

the signal points of the first phase plane is divided into m parts each including signal points $M_{11}, M_{12}, \ldots, M_{1m}$;

(n−1) pieces of $M_{ij}$ (i is set to an integer from 2 to n, and j is set to an integer from 1 to m) are assigned as signal points in an i-th phase plane corresponding to the divided $M_{11}, M_{12}, \ldots, M_{1m}$ in the first phase plane, respectively; and each $M_{ij}$ (i is set to an integer from 1 to n, and j is set to an integer from 1 to m) is set to an integer smaller than M; and a sum of respective products of signal points $M_{ij}$ where i is from 1 to n $$M_{1j} \times M_{2j} \times \ldots \times M_{nj}$$

when j is from 1 to m in the expression is equal to or over $2^{(np+q)}$; and converting, when the input signal belongs to a first group, the first converted data into data that stands at one of values from 1 to $M_{11}$ according to a value of the input signal, and the second to n-th converted data into data that stand at one of different values of $M_{21}$ through one of different values of $M_{n1}$, respectively, that are assigned according to the value of the input signal; or converting, when the input signal belongs to a j-th group (j is an integer larger than 1, and smaller than or equal to m), the first converted data into data that stands at one of values from a value which is obtained by adding 1 to a sum of signal points $M_{11}$ through $M_{1j-1}$ to a sum from $M_{11}$ through $M_{1j}$, and the second to n-th converted data into data that stand at one of different values of $M_{2j}$ through one of different values of $M_{nj}$, respectively, that are assigned according to the value of the input signal.

22. The modulation method as claimed in claim 21, wherein the M is allowed to be set to an integer other than 2 raised to the power of a positive integer, and an integer over $2^{(p+q/n)}$.

23. The modulation method as claimed in claim 21, wherein:

the M is allowed to be set to an integer other than 2 raised to the power of a positive integer, and an integer over $2^{(p+q/n)}$; and the M is an integer smaller than $2^{(p+1)}$.

24. A demodulation method for receiving and demodulating a communication signal modulated by using the modulation method as claimed in any one of claim 21, 22 or 23, comprising the steps of:

receiving and demodulating the communication signal;

outputting first to n-th demodulated data (n is an integer equal to or more than 2) in response to the demodulated signal; and outputting a data signal that takes one of values from 1 to 2 raised to the power of (n×p+q) based on values indicated by the first to n-th demodulated data in response to:

the second to n-th demodulated data that stand at one of different values of $M_{21}$ through one of different values of $M_{n1}$, respectively, when the first demodulated data takes one of values from 1 to $M_{11}$; or the second to n-th demodulated data that stand at one of different values of $M_{2j}$ through one of different values of $M_{nj}$, respectively, when the first demodulated data takes one of values from a value where a sum from $M_{11}$ to $M_{ij-1}$ (j is an integer larger than 1, and smaller than or equal to m) is added by 1 to a sum from $M_{11}$ through $M_{1j}$.

* * * * *